US011521616B2

United States Patent
(12) United States Patent
Pust et al.

(10) Patent No.: US 11,521,616 B2
(45) **Date of Patent: *Dec. 6, 2022**

(54) SYSTEM AND/OR METHOD FOR SEMANTIC PARSING OF AIR TRAFFIC CONTROL AUDIO

(71) Applicant: Merlin Labs, Inc., Boston, MA (US)

(72) Inventors: Michael Pust, Boston, MA (US); Joseph Bondaryk, Boston, MA (US); Matthew George, Boston, MA (US)

(73) Assignee: Merlin Labs, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,835

(22) Filed: Apr. 13, 2022

(65) Prior Publication Data

US 2022/0246150 A1 Aug. 4, 2022

Related U.S. Application Data

(63) Continuation-in-part of application No. 17/500,358, filed on Oct. 13, 2021.

(60) Provisional application No. 63/090,898, filed on Oct. 13, 2020.

(51) Int. Cl.
*G10L 15/22* (2006.01)
*G10L 15/16* (2006.01)
*G08G 5/00* (2006.01)

(52) U.S. Cl.
CPC .............. *G10L 15/22* (2013.01); *G08G 5/003* (2013.01); *G08G 5/0013* (2013.01); *G10L 15/16* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 5,652,897 A | 7/1997 | Linebarger et al. | |
| 6,230,131 B1 * | 5/2001 | Kuhn | G10L 13/08 704/266 |
| 6,346,892 B1 | 2/2002 | Demers et al. | |
| 9,536,522 B1 * | 1/2017 | Hall | G06F 16/3344 |
| 9,830,910 B1 | 11/2017 | Shapiro et al. | |
| 10,515,625 B1 | 12/2019 | Metallinou et al. | |
| 10,743,107 B1 | 8/2020 | Yoshioka et al. | |
| 10,832,668 B1 * | 11/2020 | Devries | G10L 15/22 |

(Continued)

FOREIGN PATENT DOCUMENTS

CN 107315737 A 11/2017

OTHER PUBLICATIONS

Chen, David L., et al., "Learning to Interpret Natural Language Navigation Instructions from Observations", Association for the Advancement of Artificial Intelligence, 2011.

(Continued)

*Primary Examiner* — Neeraj Sharma
(74) *Attorney, Agent, or Firm* — Jeffrey Schox; Diana Lin

(57) ABSTRACT

The method S200 can include: at an aircraft, receiving an audio utterance from air traffic control S210, converting the audio utterance to text, determining commands from the text using a question-and-answer model S240, and optionally controlling the aircraft based on the commands S250. The method functions to automatically interpret flight commands from the air traffic control (ATC) stream.

19 Claims, 16 Drawing Sheets

S200
Speech-to-text module
Q/A module
ATC radio
ASR/SBD model
Language model
Q/A model
FMS/FCS
signal
linguistic hypotheses
aircraft state / identification parameters
utterance hypothesis (e.g., text transcript)
Plane-Specific Speaker Identification
Command parameters
automated ATC response
Flight command
Updated aircraft state/ automated ATC response

(56) References Cited

U.S. PATENT DOCUMENTS

| | | | |
|---|---|---|---|
| 10,896,295 | B1* | 1/2021 | Shenoy ................. G10L 15/187 |
| 10,984,660 | B2 | 4/2021 | Hegranes et al. |
| 11,182,828 | B2* | 11/2021 | Dey .................. G06Q 30/0269 |
| 2008/0065275 | A1 | 3/2008 | Vizzini |
| 2009/0258333 | A1 | 10/2009 | Yu |
| 2011/0282522 | A1 | 11/2011 | Prus et al. |
| 2015/0100311 | A1* | 4/2015 | Kar ......................... G10L 15/07 704/231 |
| 2016/0093302 | A1 | 3/2016 | Bilek et al. |
| 2016/0093304 | A1 | 3/2016 | Kim et al. |
| 2016/0125873 | A1* | 5/2016 | Braho ................... G10L 15/065 704/239 |
| 2018/0061243 | A1 | 3/2018 | Shloosh |
| 2018/0182250 | A1 | 6/2018 | Bonnet et al. |
| 2019/0195652 | A1 | 6/2019 | Lafon et al. |
| 2019/0310981 | A1 | 10/2019 | Sevenster et al. |
| 2020/0027449 | A1 | 1/2020 | Lafon et al. |
| 2020/0104362 | A1* | 4/2020 | Yang ...................... G06N 20/00 |
| 2020/0110795 | A1* | 4/2020 | Gupta ..................... G06F 40/30 |
| 2020/0183983 | A1 | 6/2020 | Abe et al. |
| 2020/0335084 | A1 | 10/2020 | Wang et al. |
| 2021/0020168 | A1* | 1/2021 | Dame ..................... G10L 25/18 |
| 2021/0043095 | A1 | 2/2021 | Venkataraman et al. |
| 2021/0183360 | A1* | 6/2021 | Ebrahimifard ......... G08G 5/065 |
| 2021/0295720 | A1 | 9/2021 | Mier et al. |
| 2021/0312927 | A1* | 10/2021 | Baladhandapani ..... G10L 15/08 |
| 2021/0342634 | A1 | 11/2021 | Chen et al. |

OTHER PUBLICATIONS

Craparo, Emily M., "Natural Language Processing for Unmanned Aerial Vehicle Guidance Interfaces", Submitted to Department of Aeronautics and Astronautics on May 30, 2004, in partial fulfillment of the requirements of the degree of Master of Science in Aeronautics and Astronautics, MIT.

Gupta, Vishwa, et al., "CRIM's Speech Transcription and Call Sign Detection System for the ATC Airbus Challenge Task", Interspeech 2019, Sep. 15-19, 2019, Graz, Austria.

Paul, Saptarshi, et al., "NLP Tools Used in Civil Aviation: A Survey", International Journal of Advanced Research in Computer Science, vol. 9, No. 2, Mar.-Apr. 2018.

* cited by examiner

Domain Expert Evaluation Tool from: FI-2 to: USA1524
message: u s air fifteen twenty four boston approach meaning:
conversation_state: begin judgement:
◉ correct
○ incomplete
○ incorrect reviewer comments:

from: USA1524 to: FI-2
message: u s air fifteen twenty four checking in ah at six thousand in a right turn to south from: FI-2 to: USA1524
message: u s air fifteen twenty four boston approach turn right two five zero intercept two two loc ah two seven localizer maintain four thousand and what is your speed right now meaning:
```
altitude:
  direction: ''
  level: 4000
heading:
  compass: 250
  direction: right
request:
  mod: current
  type: airspeed
```

judgement:
○ correct
◉ incomplete
○ incorrect reviewer comments:

FIGURE 8

SYSTEM AND/OR METHOD FOR SEMANTIC PARSING OF AIR TRAFFIC CONTROL AUDIO

CROSS REFERENCE TO RELATED APPLICATIONS

This application is a continuation-in-part U.S. application Ser. No. 17/500,358, filed 13 Oct. 2021, which claims the benefit of U.S. Provisional Application No. 63/090,898, filed Oct. 13, 2020, each of which is incorporated herein in its entirety by this reference.

TECHNICAL FIELD

This invention relates generally to the aviation field, and more specifically to a new and useful semantic parser in the aviation field.

BRIEF DESCRIPTION OF THE FIGURES

FIG. 8 is a graphical representation of an example of a domain expert evaluation tool in a variant of the method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 2:
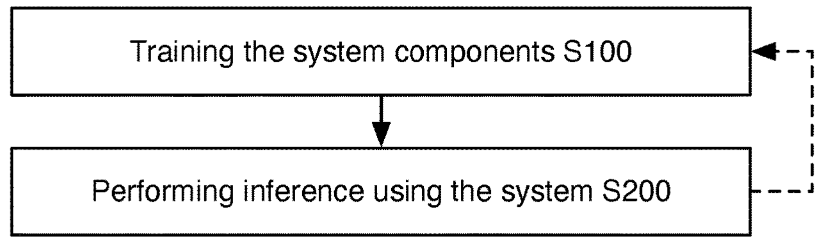
FIG. 2 is a diagrammatic representation of a variant of the method.

The method, an example of which is shown in FIG. 2, can include performing inference using the system S200; and can optionally include training the system components S100. The method functions to automatically interpret flight commands from a stream of air traffic control (ATC) radio communications. The method can additionally or alternatively function to train and/or update a natural language processing system based on ATC communications.

Figure 3:
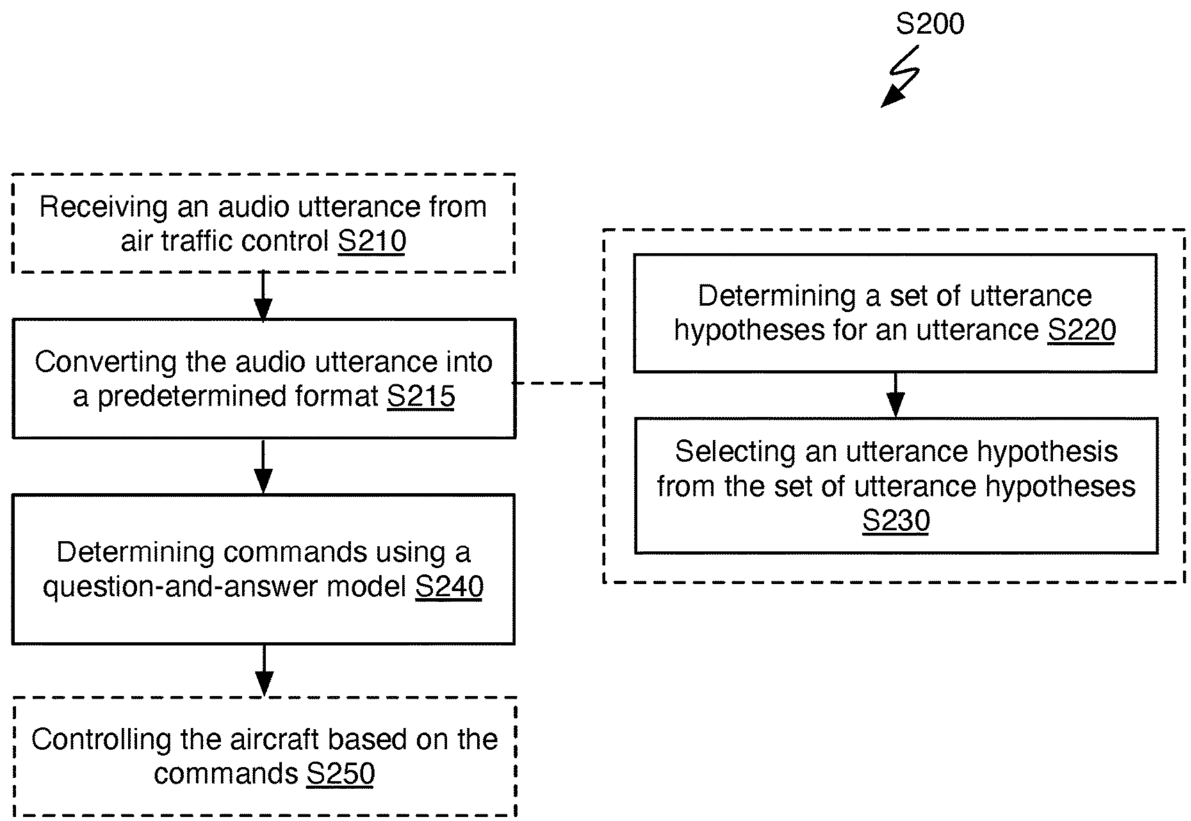
FIG. 3 is a diagrammatic representation of a variant of the method.

The performing inference S200 can include: at an aircraft, receiving an audio utterance from air traffic control S210, converting the audio utterance into a predetermined format S215, determining commands using a question-and-answer model S240, and optionally controlling the aircraft based on the commands S250 (example shown in FIG. 3). The method functions to automatically interpret flight commands from the air traffic control (ATC) stream. The flight commands can be: automatically used to control aircraft flight; presented to a user (e.g., pilot, a remote teleoperator); relayed to an auto-pilot system in response to a user (e.g., pilot) confirmation; and/or otherwise used.

In an illustrative example, the method can receive ATC audio stream, convert the ATC audio stream to ATC text, and provide the ATC text (as the reference text) and a predetermined set of queries (each associated with a different flight command parameter) to an ATC-tuned question and answer model (e.g., ATC-tuned BERT), which analyzes an ATC text for the query answers. The query answers (e.g., responses of the question and answer model) can then be used to select follow-up queries and/or fill out a command parameter value, which can be used for direct or indirect aircraft control. The ATC audio stream can be converted to the ATC text using an ATC-tuned integrated sentence boundary detection and automatic speech recognition model (SBD/ASR model) and an ATC-tuned language model, wherein an utterance hypotheses (e.g., a sentence hypothesis, utterance by an individual speaker, etc.) can be selected for inclusion in the ATC text based on the joint score from the SBD/ASR model and the language model.

S200 can be performed using a system 100 including a Speech-to-Text module and a question and answer (Q/A) module (e.g., cooperatively forming a semantic parser). The system functions to interpret audio air traffic control (ATC) audio into flight commands, and can optionally control the aircraft based on the set of flight commands.

The system 100 is preferably mounted to, installed on, integrated into, and/or configured to operate with any suitable vehicle (e.g., the system can include the vehicle). Preferably, the vehicle is an aircraft, but can alternately be a watercraft, land-based vehicle, spacecraft, and/or any other suitable vehicle. The system can be integrated with any suitable aircraft, such as a rotorcraft (e.g., helicopter, multi-copter), fixed-wing aircraft (e.g., airplane), VTOL, STOL, lighter-than-air aircraft, multi-copter, and/or any other suitable aircraft. However, the vehicle can be an autonomous aircraft, unmanned aircraft (UAV), manned aircraft (e.g., with a pilot, with an unskilled operator executing primary aircraft control), semi-autonomous aircraft, and/or any other suitable aircraft. Hereinafter, the term 'vehicle' can refer to any suitable aircraft, and the term 'aircraft' can likewise refer to any other suitable vehicle.

The system is preferably equipped on an autonomous aircraft, which is configured to control the aircraft according to a set of flight commands using a flight processing system without user (e.g., pilot) intervention. Alternatively, the system can be equipped on a semi-autonomous vehicle and/or human-operated vehicle as a flight aid. In a first variant, the system can display ATC commands to a user (e.g., pilot) and/or relay ATC commands to an auto-pilot system in response to a user (e.g., pilot) confirmation.

The term "tuned," as referenced in regard to neural networks, language models, or otherwise, can be understood to relate to tuning (e.g., adjusting) model parameters using training data. Accordingly, an ATC-tuned network can be understood as having parameters tuned based on ATC audio and/or ATC-specific semantic training data (as opposed to a network dedicated to a specific radiofrequency band).

2. Benefits.

Variations of the technology can afford several benefits and/or advantages.

First, variants of the system and method can confer increased semantic parsing accuracy over conventional systems by utilizing a multiple-query (or repeated question-and-answer) approach, for example by neural network (e.g., BERT), since existing deep neural network models have high intrinsic accuracy in responding to these types of questions.

Second, variations of this technology utilizing a multiple-query approach which asks natural language questions (e.g., "message intended for DAL456?"; "topics?"; "heading values?"; etc.) of a neural network can improve the interpretability and/or auditability of the semantic parser. In such variants, a specific module/model/query of the system can be identified as a point of failure when a user rejects a command, which can be used to further train/improve the system. In some variants, the multi-query approach can additionally enable portions of the semantic parser to be trained based on partial and/or incomplete tagged responses (e.g., which can be sufficient to answer a subset of the queries used to extract a command from an ATC transcript). As an example, training data can be used when values and/or aircraft tail numbers are not identified and/or validated within a training dataset.

Third, variations of this technology can enable semantic parsing of ATC utterances without the use of grammar rules or syntax—which can be time intensive to develop, slow to execute, and yield inaccurate results (particularly when handling edge case scenarios or unusual speech patterns). In an example: as a conversation between ATC and an aircraft continues, the ATC controller and the pilot often shorten phrases and/or deviate from the standard speech template, which can severely impact the efficacy of grammar/syntax-based NLP approaches. In variants, the system and/or method can convert unformatted audio, syntactically inconsistent (non-standardized) audio, and/or non-uniform audio data or corresponding ATC transcript into a standardized/formatted data input (e.g., as may be accepted/interpreted by a certified aircraft processor). In variants, standardized inputs can be utilized to certify aircraft systems in a deterministically testable manner. As an example, the technology can be used to convert an arbitrarily large number of audio signals into a substantially finite set of commands (e.g., with bounded ranges of values corresponding to a predetermined set of aircraft command parameters, which can be deterministically tested and/or repeatably demonstrated).

Fourth, variations of this technology can include an approach necessarily rooted in computer technology for overcoming a problem specifically arising in the realm of computer networks. In an example, the technology can automatically translate audio into a computer readable format which can be interpreted by an aircraft processor. In an example, the technology can enable control of a partially and/or fully autonomous system based on communications with ATC operators. In such examples, the system/method may act in place of an incapacitated pilot (e.g., for a manned aircraft) and/or replace an onboard pilot (e.g., for an unmanned aircraft).

Fifth, variations of this technology can enable high speed and/or high accuracy natural language processing (NLP) of air traffic control (ATC) utterances by leveraging neural network models that were pre-trained on other datasets (e.g., pretrained models), then tuned to ATC-specific semantics. These ATC-tuned models can improve the speed/accuracy of the system in the context of noisy, multi-speaker ATC channels. These ATC-tuned models can also retain the broad 'common sense' comprehension of the pre-existing model and avoid overly biasing the system towards conventional ATC language—thus enabling the system to effectively respond to edge case scenarios or speech patterns which infrequently occur in ATC communications.

However, variations of the technology can additionally or alternately provide any other suitable benefits and/or advantages.

3. System.

Figure 1:
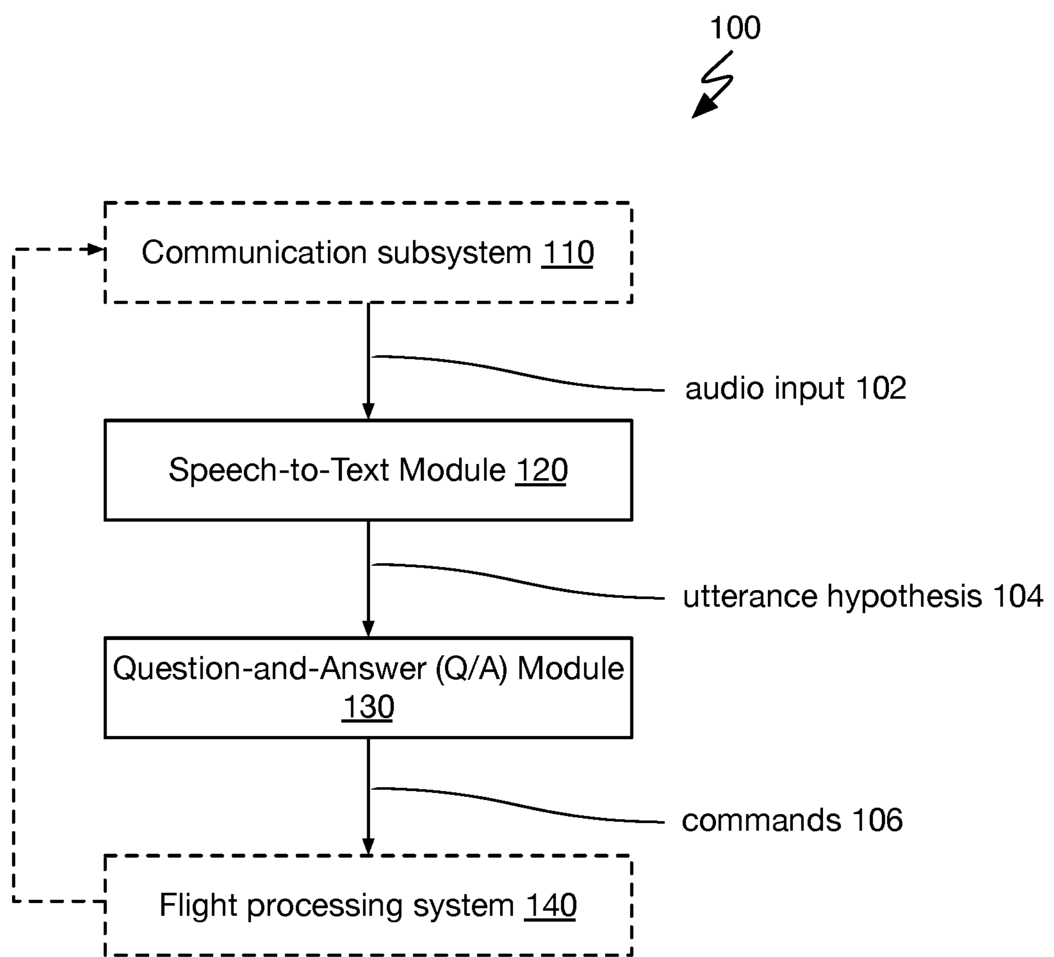
FIG. 1 is a schematic representation of a variant of the system.

The system 100, an example of which is shown in FIG. 1, can include: a Speech-to-Text module 120 and a question-and-answer (Q/A) module 130 (e.g., cooperatively the "semantic parser"). The system can optionally include a communication subsystem 110 and a flight processing system 140. However, the system 100 can additionally or alternatively include any other suitable set of components. The system 100 functions to determine flight commands 106 from an audio input 102 (e.g., received ATC radio transmission) which can be used for vehicle guidance, navigation, and/or control.

The audio input 102 can include a unitary utterance (e.g., sentence), multiple utterances (e.g., over a predetermined window—such as 30 seconds, within a continuous audio stream, over a rolling window), periods of silence, a continuous audio stream (e.g., on a particular radio channel, such as based on a current aircraft location or dedicated ATC communication channel), and/or any other suitable audio input. In a first example, the audio input can be provided as a continuous stream. In a second example, a continuous ATC radiofrequency stream can be stored locally, and a rolling window of a particular duration (e.g., last 30 seconds, dynamic window sized based on previous utterance detections, etc.) can be analyzed from the continuous radiofrequency stream.

The audio input is preferably in the form of a digital signal (e.g., radio transmission passed through an A/D converter and/or a wireless communication chipset), however can be in any suitable data format. In a specific example, the audio input is a radio stream from an ATC station in a digital format. In variants, the system can directly receive radio communications from an ATC tower and translate the communications into commands which can be interpreted by a flight processing system. In a first 'human in the loop' example, a user (e.g., pilot in command, unskilled operator, remote moderator, etc.) can confirm and/or validate the commands before they are sent to and/or executed by the flight processing system. In a second 'autonomous' example, commands can be sent to and/or executed by the flight processing system without direct involvement of a human. However, the system 100 can otherwise suitably determine commands from an audio input.

The system 100 is preferably mounted to, installed on, integrated into, and/or configured to operate with any suitable vehicle (e.g., the system can include the vehicle). The system 100 is preferably specific to the vehicle (e.g., the modules are specifically trained for the vehicle, the module is trained on a vehicle-specific dataset), but can be generic across multiple vehicles. The vehicle is preferably an aircraft (e.g., cargo aircraft, autonomous aircraft, passenger aircraft, manually piloted aircraft, manned aircraft, unmanned aircraft, etc.), but can alternately be a watercraft, land-based vehicle, spacecraft, and/or any other suitable vehicle. In a specific example, the aircraft can include exactly one pilot/PIC, where the system can function as a backup or failsafe in the event the sole pilot/PIC becomes incapacitated (e.g., an autonomous co-pilot, enabling remote validation of aircraft control, etc.).

Figure 12:
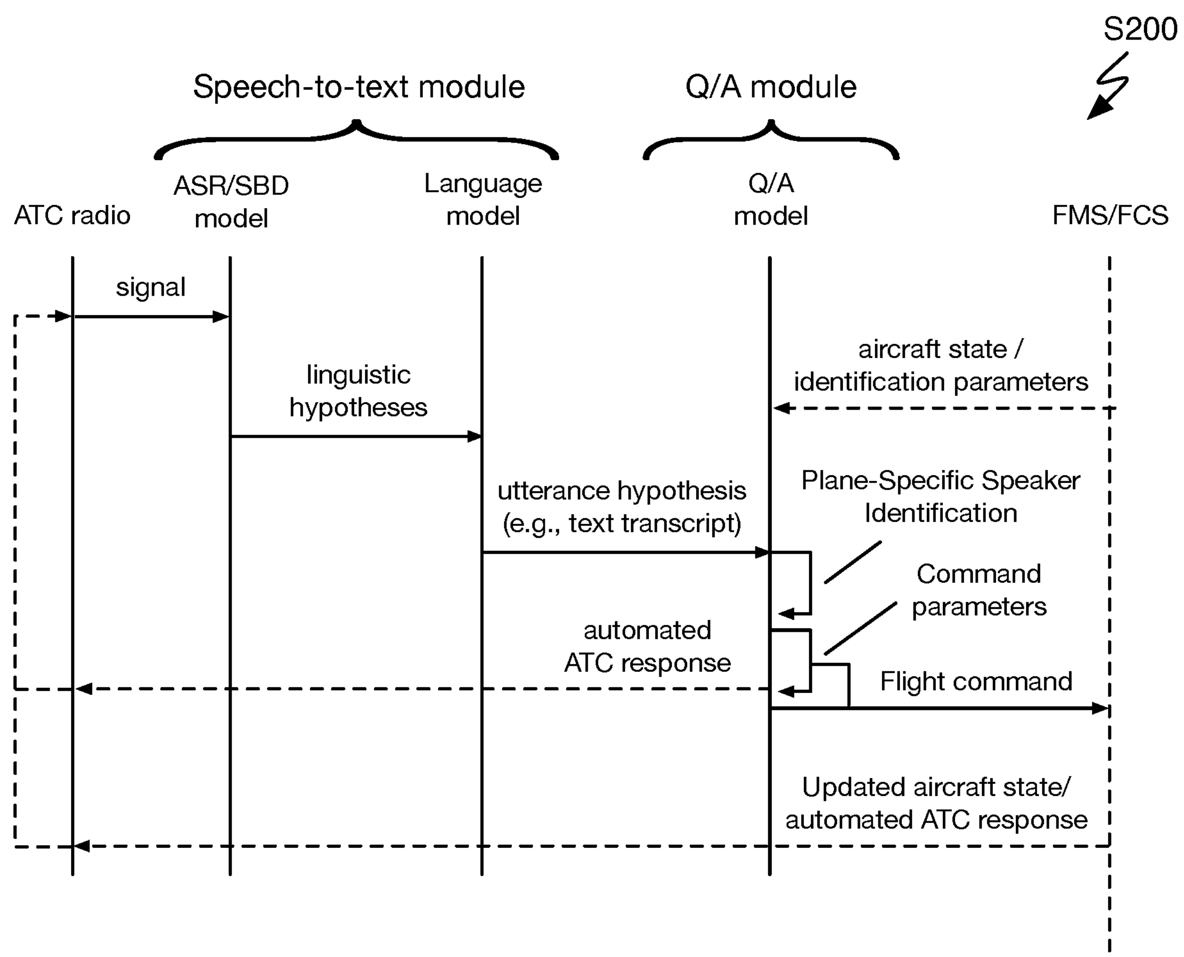
FIG. 12 is a diagrammatic representation of a variant of the system and/or method.

The system 100 can include any suitable data processors and/or processing modules. Data processing for the various system and/or method elements preferably occurs locally onboard the aircraft, but can additionally or alternatively be distributed among remote processing systems (e.g., for primary and/or redundant processing operations), such as at a remote validation site, at an ATC data center, on a cloud computing system, and/or at any other suitable location. Data processing for the Speech-to-Text module and Q/A module can be centralized or distributed. In a specific example, the data processing for the Speech-to-Text module and the Q/A module can occur at a separate processing system from the flight processing system (e.g., are not performed by the FMS or FCS processing systems; the Speech-to-Text module and Q/A module can be decoupled from the FMS/FCS processing; an example is shown in FIG. 12), but can additionally or alternatively be occur at the same compute node and/or within the same (certified) aircraft system. Data processing can be executed at redundant endpoints (e.g., redundant onboard/aircraft endpoints), or can be unitary for various instances of system/method. In a first variant, the system can include a first natural language processing (NLP) system, which includes the Speech-to-Text module and the Q/A module, which can be used with a second flight processing system, which includes the flight processing system and/or communication systems (e.g., ATC radio). In a second variant, an aircraft can include a unified 'onboard' processing system for all runtime/inference processing operations. In a third variant, remote (e.g., cloud) processing can be utilized for Speech-to-Text operations and/or Q/A response generation. However, the system 100 can include any other suitable data processing systems/operations.

The system 100 can optionally include a communication subsystem, which functions to transform an ATC communication (e.g., radio signal) into an audio input which can be processed by the ASR module. Additionally or alternately, the communication subsystem can be configured to communicate a response to ATC. The communication subsystem can include an antenna, radio receiver (e.g., ATC radio receiver), a radio transmitter, an A/D converter, filters, amplifiers, mixers, modulators/demodulators, detectors, a wireless (radiofrequency) communication chipset, and/or any other suitable components. The communication subsystem include: an ATC radio, cellular communications device, VHF/UHF radio, and/or any other suitable communication devices. In a specific example, the communication subsystem is configured to execute S210. However, the communication subsystem can include any other suitable components, and/or otherwise suitably establish communication with air traffic control (ATC).

The Speech-to-Text module of the system 100 functions to convert the audio input (e.g., ATC radio signal) into an utterance hypothesis 104, such as in the form of text (e.g., an ATC transcript) and/or alphanumeric characters. The utterance hypothesis is preferably a text stream (e.g., dynamic transcript), but can alternatively be a text document (e.g., static transcript), a string of alphanumeric characters (e.g., ASCII characters), or have any other suitable human-readable and/or machine-readable format. The Speech-to-Text module is preferably onboard the aircraft, but can additionally or alternatively be remote. The Speech-to-Text module is preferably an ATC-tuned Speech-to-Text module, which includes one or more models pre-trained on ATC audio data, but can additionally or alternatively include one or more generic models/networks and/or models/networks pre-trained on generalized training data (e.g., natural language utterances not associated with ATC communication).

The Speech-to-Text module can include: an integrated automatic speech recognition (ASR) module 122, a sentence boundary detection (SBD) module 124, a language module 126, and/or other modules, and/or combinations thereof. In a specific example, the Speech-to-Text module can include an integrated ASR/SBD module 125. The Speech-to-Text module (and/or submodules thereof) can include a neural network (e.g., DNN, CNN, RNN, etc.), a cascade of neural networks, compositional networks, Bayesian networks, Markov chains, pre-determined rules, probability distributions, attention-based models, heuristics, probabilistic graphical models, or other models. The Speech-to-Text module (and/or submodules thereof) can be tuned versions of pretrained models (e.g., pretrained for another domain or use case, using different training data), be trained versions of previously untrained models, and/or be otherwise constructed.

In variants, a submodule(s) of the Speech-to-Text module (e.g., ASR module and/or SBD module) can ingest the audio input (e.g., audio stream, audio clip) and generate a set of linguistic hypotheses (e.g., weighted or unweighted), which can serve as an intermediate data format, such as may be used to audit the Speech-to-Text module, audit sub-modules/models therein, and/or select a unitary utterance hypothesis. The set of linguistic hypotheses can include overlapping/alternative hypotheses for segments of audio, or can be unitary (e.g., a single hypothesis for an individual audio segment or time period). The set of linguistic hypotheses can include: utterance hypotheses (e.g., utterance hypothesis candidates), letters, word-segment streams, phonemes, words, sentence segments (e.g., text format), word sequences (e.g., phrases), sentences, speaker changes, utterance breaks (e.g., starts, stops, etc.), and/or any other suitable hypotheses. In variants where the audio stream includes multiple speakers/utterances, the set of linguistic hypotheses can additionally include an utterance boundary hypothesis which can distinguish multiple speakers and/or identify the initiation and termination of an utterance, with an associated weight and/or a speaker hypothesis (e.g., tag identifying a particular speaker, tag identifying a particular aircraft/tower). Additionally or alternately, the utterance boundary hypothesis can identify utterance boundaries and/or change in speaker without identifying individual speaker(s). Each linguistic hypothesis preferably includes an associated weight/score associated with an utterance (and/or utterance boundary), assigned according to a relative confidence (e.g., statistical; such as determined using an ASR model, SBD model, and/or language model; etc.). The set of linguistic hypotheses is preferably ordered, sequential, and/or time-stamped in association with the receipt time, but can be otherwise suitably related.

However, the Speech-to-Text module can generate, store, and/or output any other suitable set of hypotheses. As an example, the linguistic hypotheses can include a plurality of utterance hypotheses, wherein a single utterance hypothesis can be selected based on the set of generated set of utterance hypotheses. As a second example, a subset (e.g., complete set) of linguistic hypotheses, with a corresponding weight/score, can be output by the Speech-to-Text module.

The Speech-to-Text module can include an ASR module which functions to extract linguistic hypotheses from the audio input. Using the audio input, the ASR module can determine a sequence of linguistic hypotheses, such as: letters, word-segment streams, phonemes, words, sentence segments (e.g., text format), word sequences (e.g., phrases), sentences, and/or any other suitable linguistic hypotheses (e.g., with a corresponding weight). The ASR module is preferably a neural network (e.g., Wav2Letter, Kaldi, Botium, etc.), but can alternatively be any other suitable model. In an example, a pretrained neural network can be tuned for ATC audio and/or trained using ATC audio (e.g., with an associated transcript). In a second example, the ASR module can include the ASR model trained by S110 and/or S120. In a specific example, the ASR module is configured to execute S220 of the method. The ASR module can optionally include an integrated SBD module. In variants where the ASR module outputs lower-level linguistic components (e.g., phonemes, phonetics, etc.), the system can optionally include auxiliary transformation modules (e.g., phoneme-to-word transformations) that convert the lower-level linguistic components to linguistic components compatible by the language module and/or other system modules.

Figure 10A:
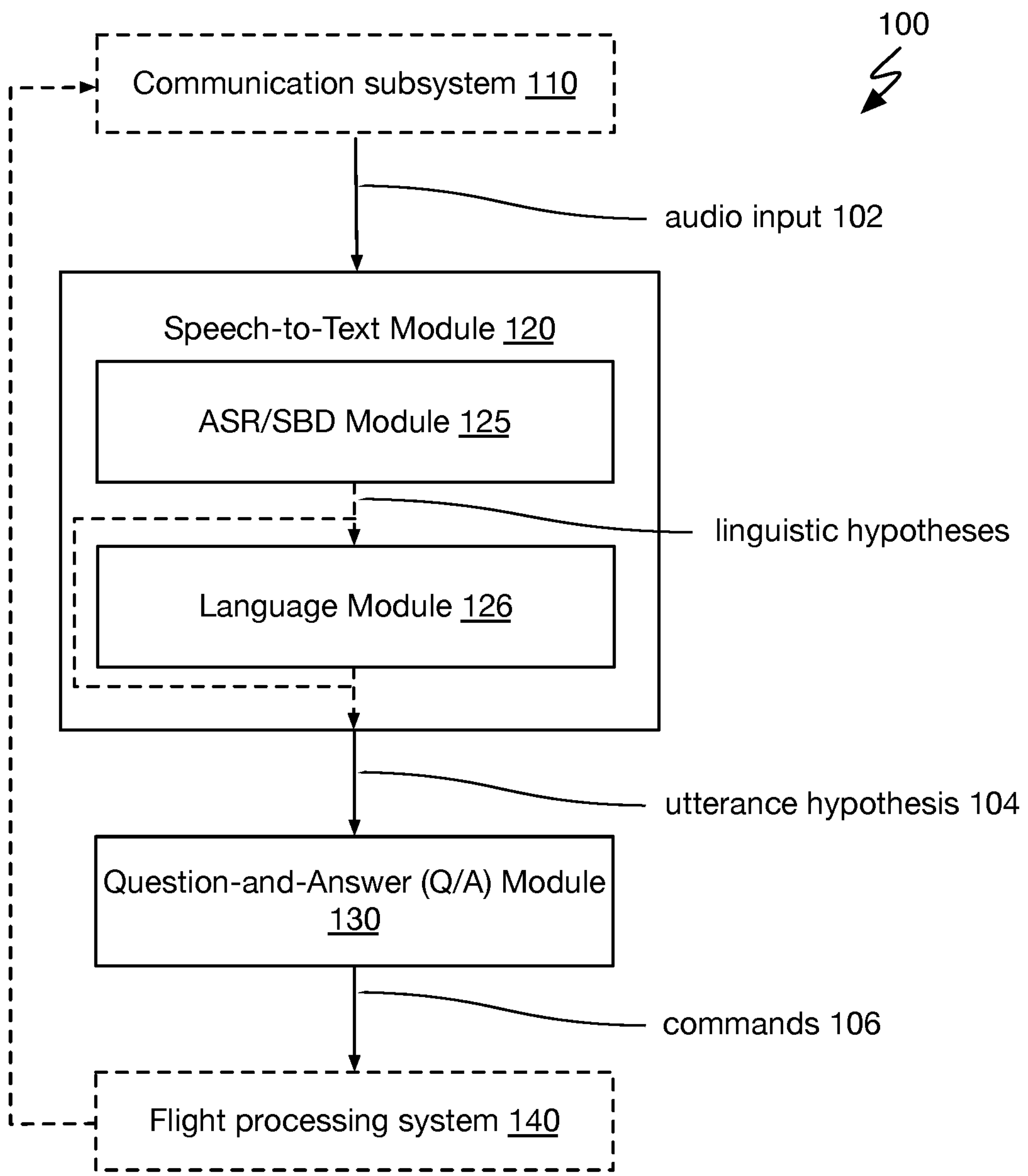
FIGS. 10A-D are diagrammatic representations of a first, second, third, and fourth variant of the system, respectively.
Figure 10B:
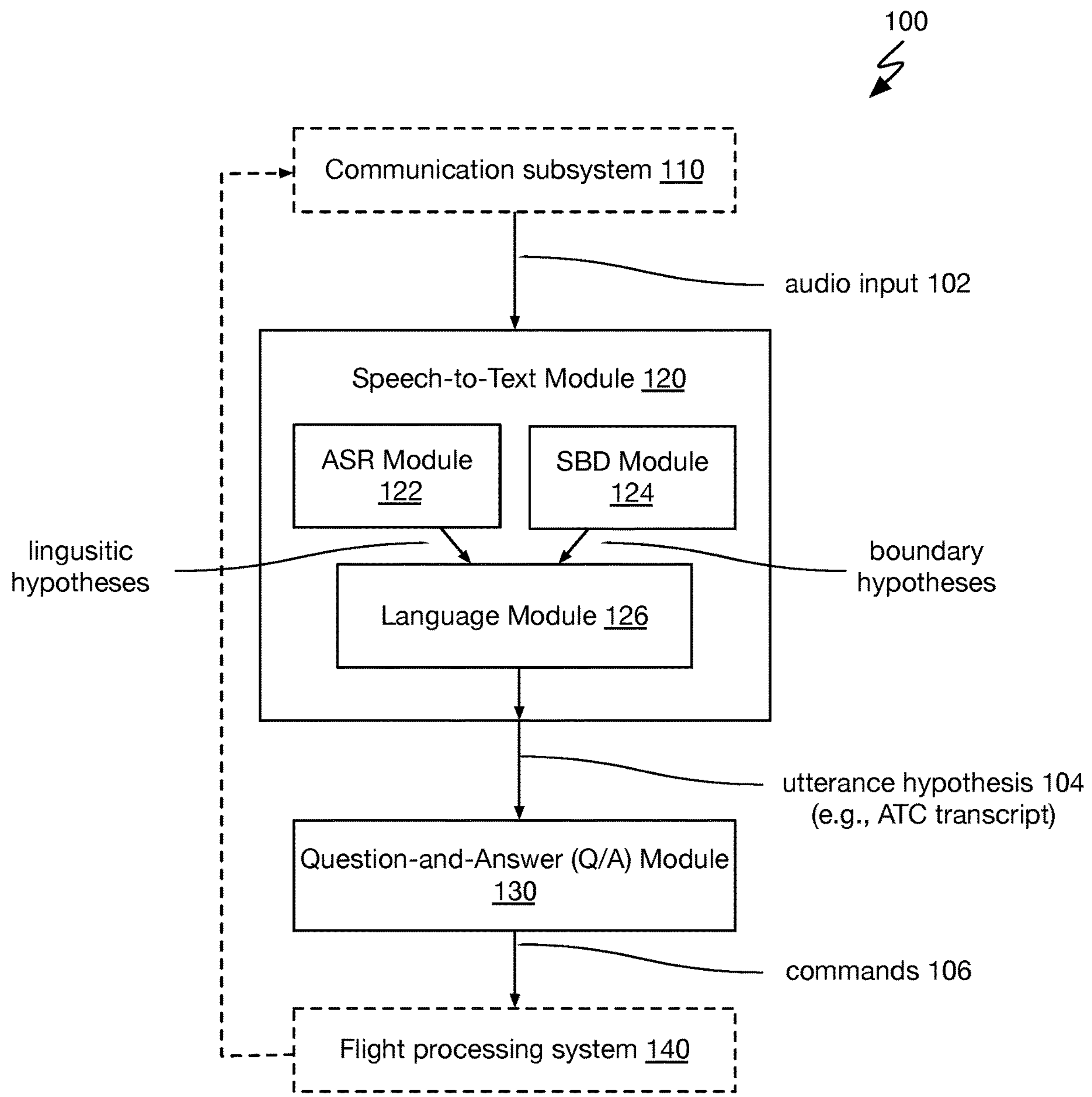
Figure 10C:
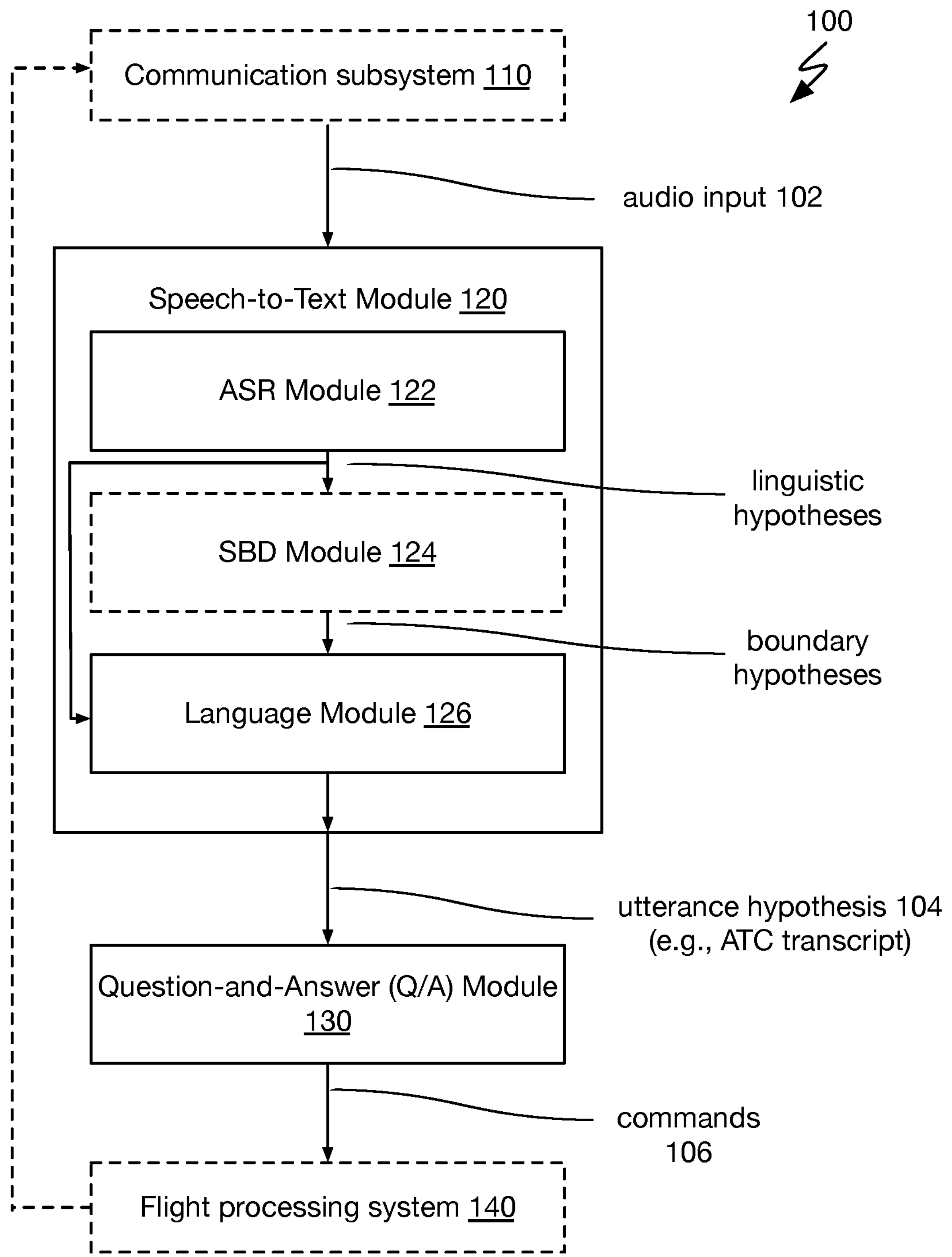
Figure 10D:
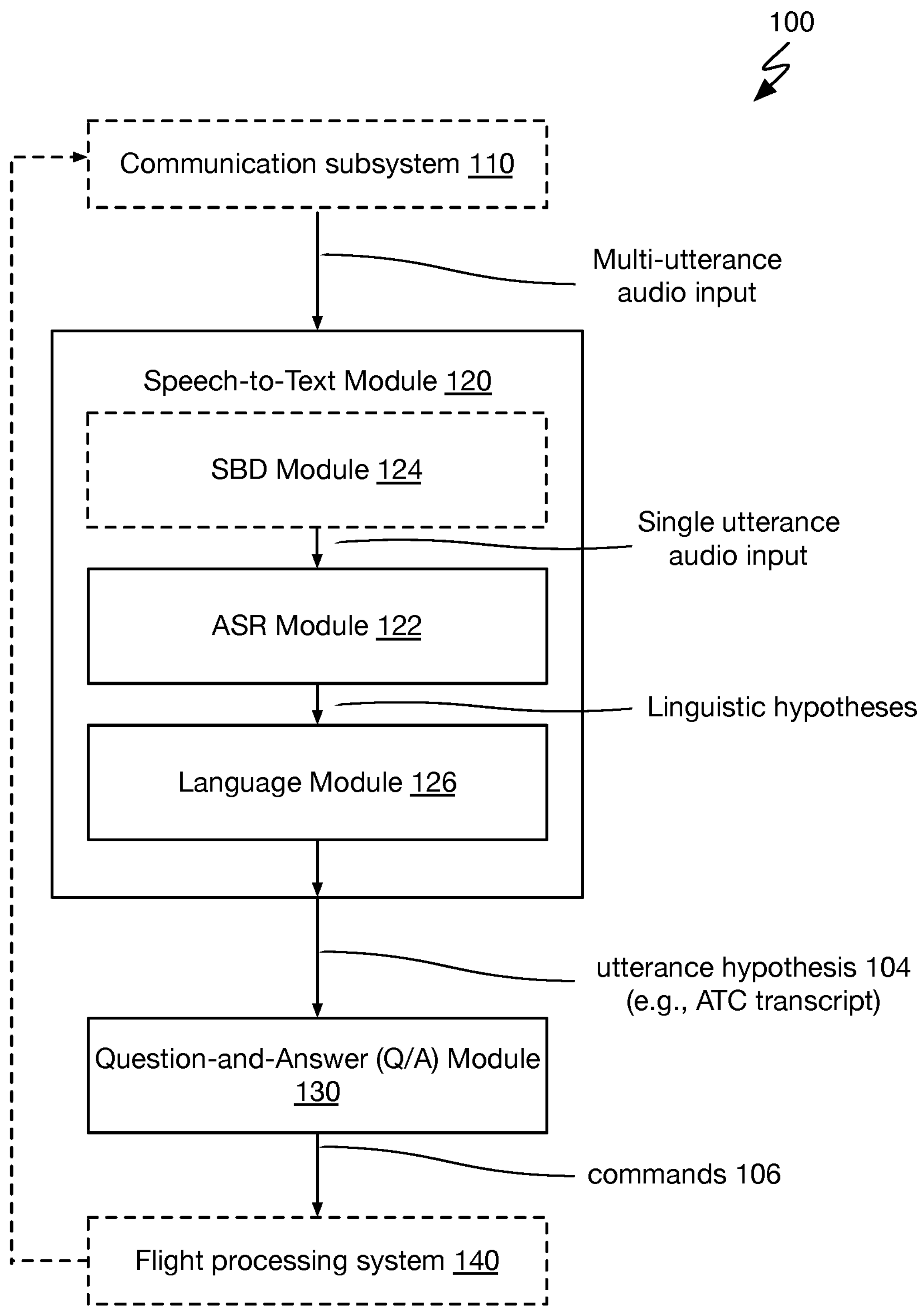
Figure 11A:
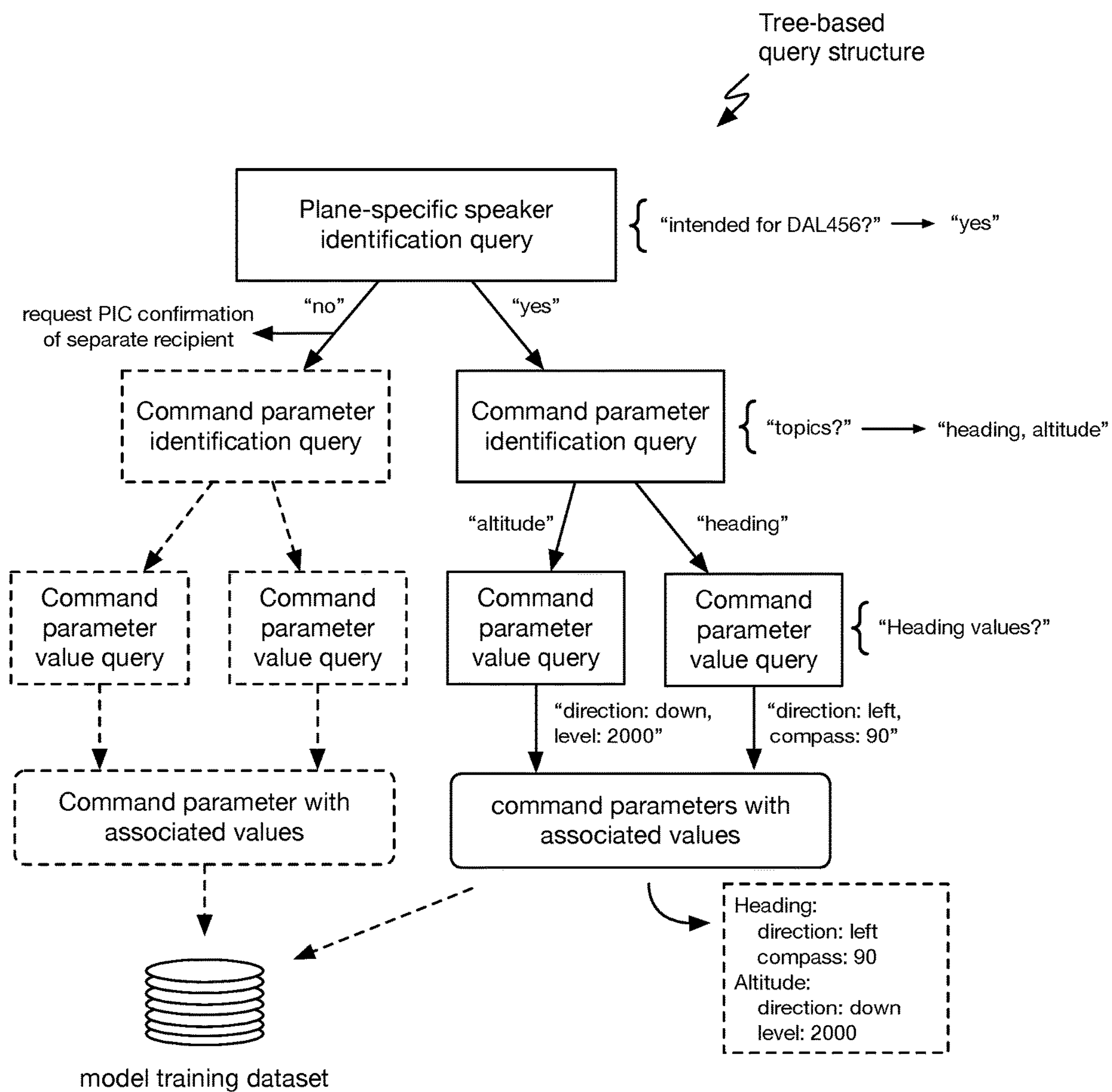
FIGS. 11A-C are first, second, and third examples of tree-based query structures, respectively.
Figure 11B:
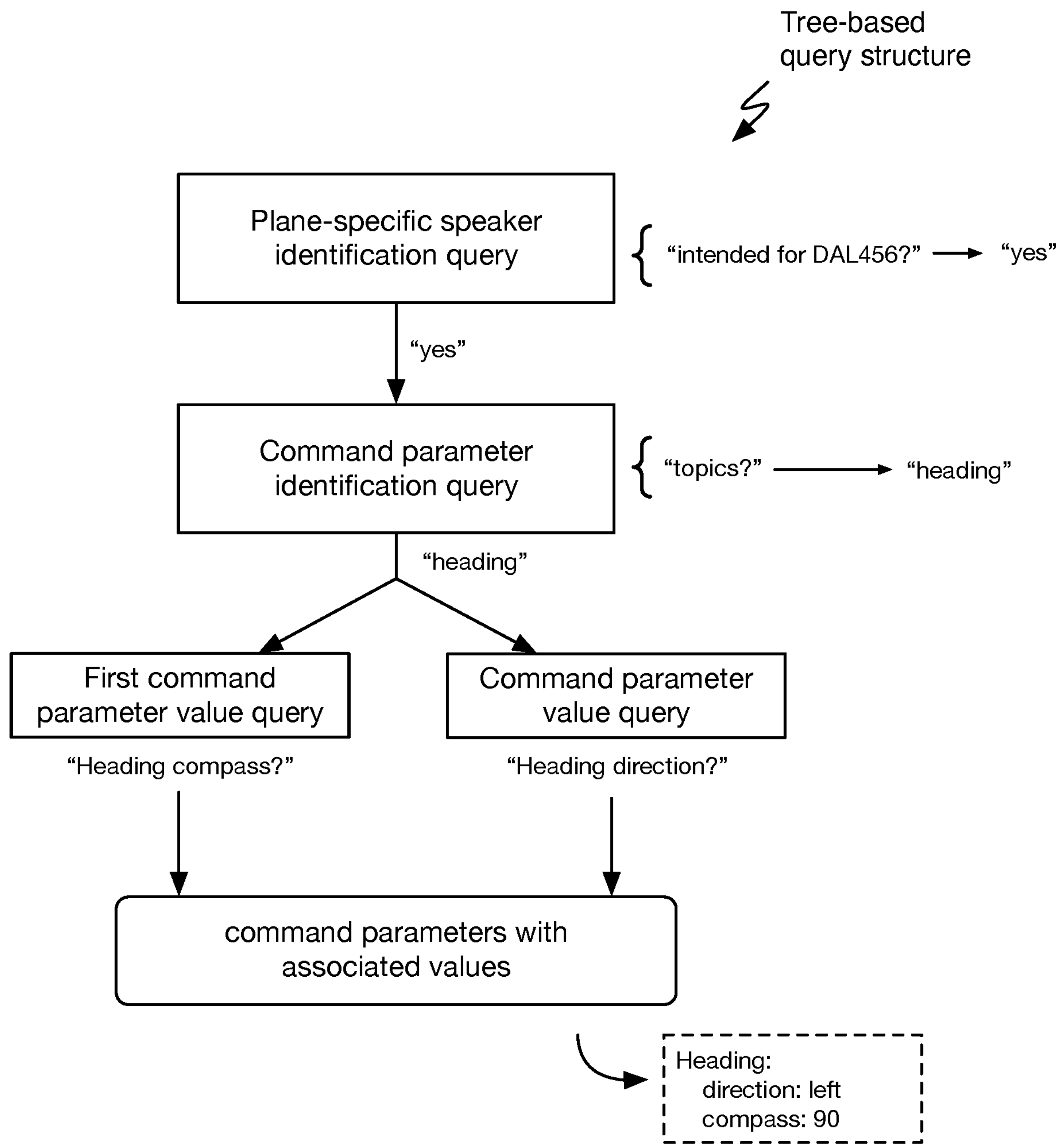
Figure 11C:
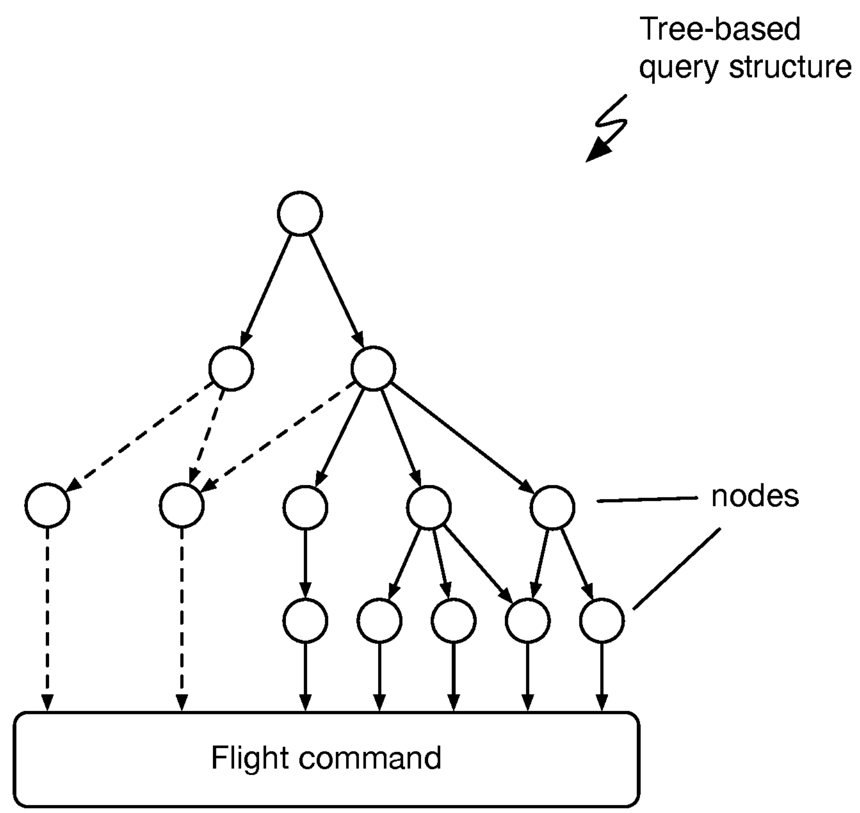

The Speech-to-Text module can include an SBD module which functions to identify utterance boundaries and/or speaker changes for a multi-utterance audio inputs. Using the audio input, the SBD module can determine a sequence of linguistic hypotheses, such as: an utterance boundary hypothesis, a speaker hypothesis (e.g., tag identifying a particular speaker, tag identifying a particular aircraft/tower), and/or any other suitable hypotheses. The SBD module is preferably integrated with the ASR module (an example is shown in FIG. 1A), but can otherwise be separate from the ASR module, such as operating sequentially with the ASR module (e.g., passing a single utterance input into the ASR module, tagging outputs of the ASR module, etc.; examples are shown in FIGS. 10C-D) or in parallel with the ASR module (e.g., separately providing speaker change and/or utterance boundary annotations by way of time stamps, etc.; an example is shown in FIG. 10B). The SBD module is preferably a neural network (e.g., Wav2Letter, Kaldi, Botium, etc.), but can alternatively be any other suitable model. In an example, a pretrained SBD neural network can be tuned for ATC audio and/or trained using ATC audio (e.g., with an associated transcript). In a second example, an SBD neural network can be trained separately from the ASR module (e.g., using a distinct training set, using a training set including periods of radio silence and/or audio artifacts, etc.). In a third example, the SBD model can be tuned for ATC audio and/or trained using ATC audio, such as trained to identify silence speakers and/or utterance boundary characters (e.g., transition speakers, transition audio artifacts). However, the Speech-to-Text module can include any other suitable SBD module(s).

The language module of the Speech-to-Text module functions to select an utterance hypothesis based on the set of linguistic hypotheses, which can then be passed into the Q/A module. The language module receives the set of linguistic hypotheses from the ASR module (e.g., phonemes, words, sentence subsets, etc.) and returns an utterance hypothesis associated with a single utterance (e.g., a sentence, a series of linguistic hypothesis, etc.). The language module preferably determines the utterance hypothesis purely from the linguistic hypotheses, but can alternatively or additionally ingest the audio input and/or other auxiliary data. Auxiliary data can include: an aircraft ID, contextual information (e.g., vehicle state, geographical position, ATC control tower ID and/or location, etc.), weather data, and/or any other suitable information. The utterance hypothesis is preferably text (e.g., a text string or utterance transcript), but can alternatively be a set of phoneme indexes, audio, or any suitable data format.

The language module preferably selects an utterance hypothesis from the set of linguistic hypotheses by weighting the likelihood of various 'sound-based' language interpretations in the context of the entire utterance and/or ATC language patterns. In a first variant, the language module assigns language weights/scores to each utterance hypothesis using a neural network language model (e.g., an LSTM network, a CNN, FairSeq ConvLM, etc.) tuned for ATC language (e.g., neural network trained using ATC transcripts, etc.; such as a language model trained according to S140). In a second variant, the language module assigns language weights/scores according to a grammar-based language model (e.g., according to a set of heuristics, grammar rules, etc.). In a third variant, the language module can be tightly integrated with the ASR module. In examples, a language model(s) can be used during the search, during the first pass, and/or during reranking. However, the language module can assign weights/scores in any other suitable manner. In a specific example, the language module is configured to execute S230 of the method.

In an example, the Speech-to-Text module transforms an ATC audio stream into a natural language text transcript which is provided to the Q/A module, preserving the syntax as conveyed by the ATC speaker (e.g., arbitrary, inconsistent, non-uniform syntax).

Alternatively, the speech-to-text module can include a neural network trained (e.g., using audio data labeled with an audio transcript) to output utterance hypotheses (e.g., one or more series of linguistic components separated by utterance boundaries) based on an audio input. However, the speech-to-text module can include: only an automated speech recognition module, only a language module, and/or be otherwise constructed.

However, the system can include any other suitable Speech-to-Text module.

Figure 7:
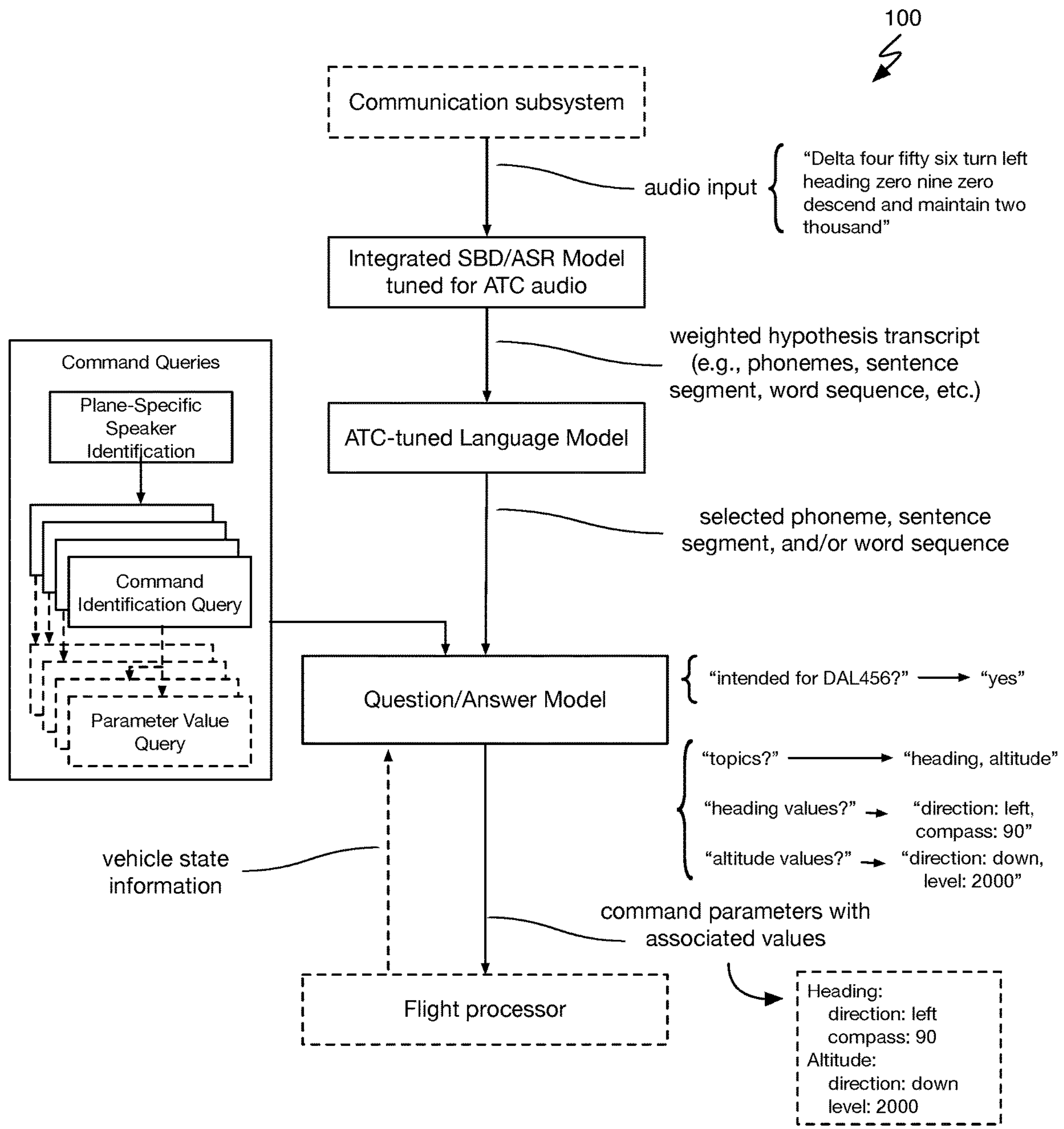
FIG. 7 is a schematic representation of an example of the system.

The system 100 can include a question-and-answer (Q/A) module (example shown in FIG. 7), which functions to determine a set of commands from the selected hypothesis (e.g., text transcript) using a set of flight command queries. The Q/A module preferably receives an utterance hypothesis from the Speech-to-Text module in text, but can alternately receive audio and/or any other suitable inputs.

The Q/A module preferably includes one or more Q/A models (e.g., BERT, BERT tuned to ATC applications, etc.), but can additionally or alternatively include a classifier or other model. The Q/A model is preferably a pre-trained language model tuned for ATC transcripts but can be untrained or have another format. The Q/A model can be: a convolutional neural network, a (pre-trained) large neural language model, bidirectional encoder representations from transformers (BERT), generative pre-trained transformer (GPT), and/or any other suitable language model. However, the Q/A module can include any other suitable neural language models.

The Q/A module preferably answers a set of flight command queries (e.g., natural language queries). The flight command queries are preferably predetermined (e.g., manually determined, extracted from a command template, etc.), but can be dynamically determined. Flight command queries are preferably semantic queries in a human-readable format, but can additionally or alternatively be provided in a machine-readable format. The command queries are preferably natural language ("reading comprehension"), but can alternatively be vectors, tensors, and/or have another format. The set of flight command queries is preferably organized in a hierarchical structure (e.g., with parent-child query relationships), but can alternatively be organized in a serial structure, or be otherwise organized. The flight command queries can be organized in a list, a tree, or otherwise organized. In variants, flight command queries can be provided as a sequence/series of chained nodes (examples are shown in FIGS. 1A-C), each node corresponding to a predetermined query, wherein the nodes include a set of independent nodes and a set of dependent nodes, each dependent node linked to a specific answer/response (e.g., specific answer value) of a broader/higher-level parent semantic query (e.g., where queries have a finite set of answers or a closed range of answers). Accordingly, dependent queries may be triggered in response to a determination of a predetermined answer at a higher-level linked node. Alternatively, the set of predetermined flight command queries can be provided synchronously or asynchronously in any suitable combination/permutation of series and/or parallel.

The command queries can be configured to have binary answers (e.g., "yes", "no", discrete answers (e.g., letters, integers, etc.), continuous answers (e.g., coordinate values, etc.), and/or any other suitable type of answer value. Different types of commands can have different query structures. For example, high-criticality queries, such as aircraft identifiers, can be structured as binary queries. In another example, attributes with multiple potential answers can be structured as open-ended questions (e.g., "topics?") instead of binary questions (e.g., "Does the utterance include heading?" Does the utterance include altitude?"). However, the queries can be otherwise structured. Examples of command queries include: whether the aircraft is the intended recipient of an utterance hypothesis, what or whether command parameters or topics (e.g., heading, altitude, etc.) are included in the utterance hypothesis, what or whether command parameter values (e.g., altitude direction, altitude level, etc.) are included in the utterance hypothesis, and/or other queries. In a first example, the Q/A module determines that the utterance is intended for the aircraft (e.g., Question: "Intended for DAL456?"; Answer: "yes"). In a second example, the Q/A module determines the topics of an utterance (e.g., Question: "Topics?"; Answer: "Heading, Altitude"). In a third example, the Q/A determines the values associated with a topic of the utterance (e.g., Question: "Altitude values?"; Answer: "Direction: down, Level: 2000"). In an example, the Q/A module can be configured to execute S240.

Based on the queries, the Q/A module outputs a set of flight commands, which can include guidance commands (e.g., navigational instructions; sequences of waypoints, approach landing site, etc.), vehicle state commands (e.g., instructions to modify vehicle state parameters, increase altitude to 5000 ft, etc.), effector state commands (e.g., effector instructions; deploy landing gear, etc.), flightpath commands (e.g., trajectory between waypoints, etc.), and/or any other suitable commands. The commands preferably output in a prescribed format based on the answers generated by the Q/A module, such as a standardized human-readable format (e.g., allowing human validation) and/or a machine-readable format (e.g., allowing human interpretation/validation of the commands). In a specific example, the commands can be provided as the union of the answers to the command parameter identification query and at least one command parameter value query (e.g., corresponding to the answer of the command parameter identification query). In a second example, the commands can be directly taken as a combination of each answer/response as generated by the Q/A module. Output commands are preferably text based and/or alphanumeric, but can be otherwise suitably provided (e.g., text-to-speech validation, etc.). In some variants, the commands can be post-processed according to any suitable heuristics, grammar rules, or formatting protocols, but can otherwise be provided to a pilot and/or flight processing system directly as the output of the Q/A module. In a specific example, the Q/A module can convert an utterance hypothesis into a command in a standardized data format (e.g., as may be accepted/interpreted by a certified aircraft processor). In variants, the commands can include a substantially finite set of command parameters (e.g., altitude, heading, etc.) corresponding to a predetermined set of topics. Additionally, command parameters can be within substantially finite and/or bounded ranges (e.g., heading limited to compass directions, altitude limited by physical aircraft constraints, commands cooperatively limited by flight envelope, etc.). However, command parameters can additionally or alternatively be arbitrary, unbounded, and/or substantially unconstrained. However, the Q/A module can generate any other suitable commands.

However, the system can include any other suitable Q/A module.

The system 100 can optionally include and/or be used with a flight processing system, which functions to control various effectors of the aircraft according to the commands. The flight processing system can include an aircraft flight management system (FMS), a flight control system (FCS), flight guidance/navigation systems, and/or any other suitable processors and/or control systems. The flight processing system can control flight effectors/actuators during normal operation of the vehicle, takeoff, landing, and/or sustained flight. Alternatively, the flight processing system can be configured to implement conventional manual flight controls in a flight-assistive configuration. The system can include a single flight processing system, multiple (e.g., three) redundant flight processing systems, and/or any other suitable number of flight processing systems. The flight processing system(s) can be located onboard the aircraft, distributed between the aircraft and a remote system, remote from the aircraft, and/or otherwise suitably distributed. In a specific example, the flight processing system is configured to execute S250.

In variants, the flight processing system can be configured (e.g., certified) to accept only a predetermined set of command input and/or inputs having a predetermined format, where the outputs of the Q/A model are provided in the predetermined format and/or are a subset of the predetermined set of commands.

However, the system can include any other suitable components and/or be otherwise suitably configured to execute S200 of the method.

4. Method.

The method, an example of which is shown in FIG. 2, can optionally include training the system components S100; and performing inference using the system S200. The method functions to automatically interpret flight commands from a stream of air traffic control (ATC) radio communications. The method can additionally or alternatively function to train and/or update a natural language processing system based on ATC communications.

4.1 Training

Figure 9:
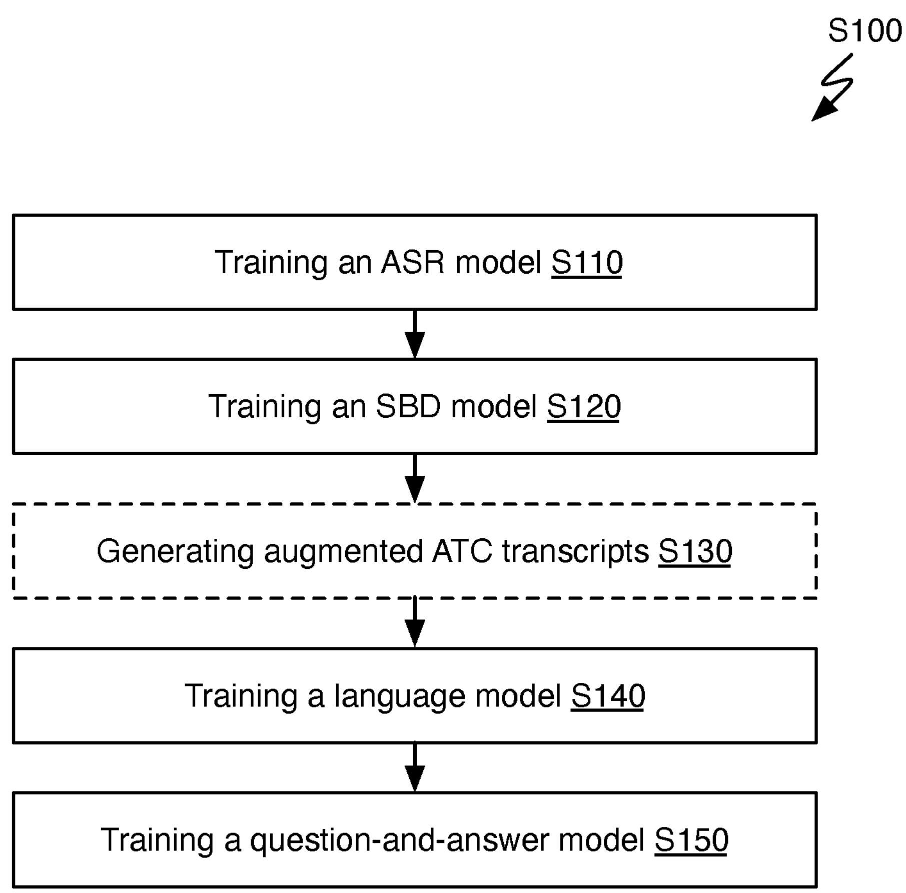
FIG. 9 is a diagrammatic representation of a variant of the method.

Training the system components S100 (example shown in FIG. 9) functions to generate an ATC-tuned system capable of interpreting ATC audio signals into flight commands. S100 can include training a Speech-to-Text model and training a question-and-answer (Q/A) model S150. S100 can optionally include generating augmented ATC transcripts S130. However, training the semantic parser S100 can include any other suitable elements. S100 is preferably performed offline and/or by a remote computing system, but can alternatively be performed onboard the aircraft (e.g., locally, during flight, asynchronously with aircraft flight).

Training the Speech-to-Text model functions to generate a transcription model that is specific to ATC communications, accounting for ATC-specific grammar, lexicon, speech patterns, and other idiosyncrasies. Training the Speech-to-Text model can include training an ASR model S110, training an SBD model S120, training a language model S140, and/or any other suitable elements. Training can include: tuning the network weights, determining weights de novo, and/or otherwise training the network. Training (and/or inference) can leverage: gradient-based methods (e.g., stochastic gradient descent), belief propagation (e.g., sum-product message passing; max product message passing, etc.), and/or any other suitable training method.

Figure 4:
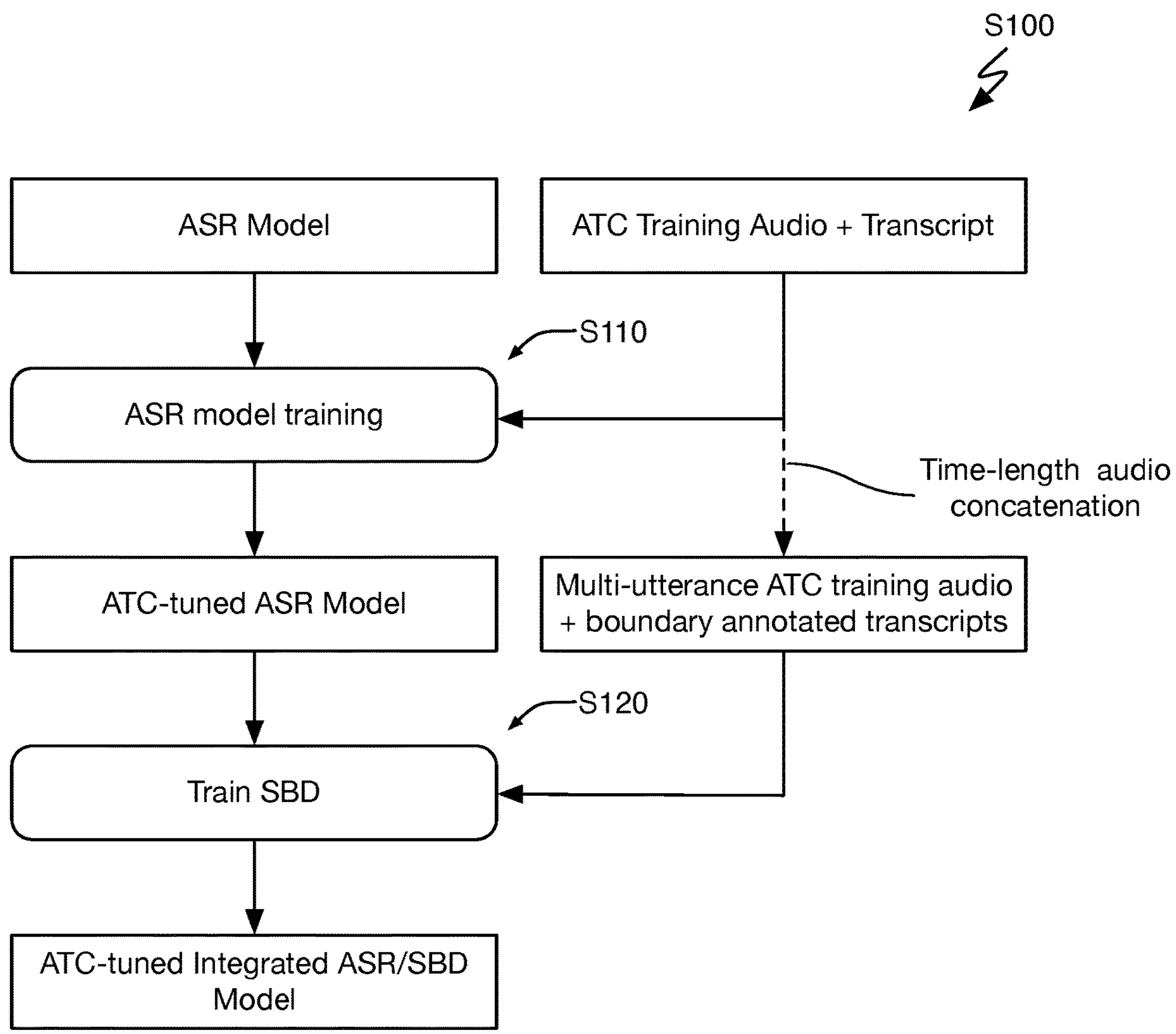
FIG. 4 is a diagrammatic representation of an example of training an ASR model in a variant of the method.

Training an automatic speech recognition (ASR) module S110 functions to train a neural network to recognize natural language in ATC communications. The ASR model is preferably trained (e.g., using supervised training, semi-supervised training) from a pre-existing ASR model (e.g., Wav2Letter), and can be 'tuned' by providing the neural network a mix (e.g., 50/50, 60/40, 70/30, pre-determined mix, 100/0, etc.) of ATC training audio with corresponding ATC transcripts and the original training data (e.g., from the pre-existing model). An example is shown in FIG. 4. The ATC training audio with transcripts is preferably manually determined (e.g., by a human, by a domain expert), but can be verified/audited ATC communication audio/transcripts (e.g., generated from an existing ASR model), and/or otherwise determined. The ATC training audio can include a single utterance, multiple utterances, a stream of radio communication over an ATC communications channel, and/or any other suitable training audio. Preferably, utterances (e.g., statements from an individual speaker, sentences, etc.) are individually associated with a transcript as part of the training data. However, the ASR model can be otherwise trained for ATC speech recognition.

Training a sentence boundary detection (SBD) module S120 functions to train the Speech-to-Text module to identify utterance boundaries (e.g., sentence segment boundaries, sentence boundaries). S120 can optionally train the Speech-to-Text module to differentiate unique utterances and/or utterances from different speakers/entities. S120 can train an existing ASR model (e.g., as determined in S110, which generates an integrated ASR/SBD model) or a separate model to generate the SBD module. Preferably, the SBD model can be trained using time-length concatenated audio, which includes a series of multiple utterances and periods of silence (e.g., periods of no speaking) therebetween, and the associated multi-utterance training transcripts. The ATC audio and transcripts used to train the SBD model can be the same as the ASR model and/or different from the ASR model.

Multi-utterance training transcripts preferably include boundary annotations (e.g., with a unique boundary character or other identifier; using a '/' or '%' character; etc.) which can delineate unique speakers, unique utterances, breaks between utterances, periods of silence, audio artifacts (e.g., the "squelch" when the ATC speaker starts and/or starts broadcasting), and/or any other appropriate boundaries. Boundary annotations are preferably automatically added during transcript concatenation, but can be inserted manually, be determined from the audio, and/or otherwise added.

In a specific example, the ASR model is trained by assigning a unique 'silence speaker' and/or a unique 'transition speaker' in the audio and/or transcript-which can be particularly advantageous in SBD for ATC radio communications, commonly exhibit a characteristic radio "squelch" sound prior to an utterance. By assigning these segments of audio to a unique 'transition speaker' (or a 'squelch speaker') the SBD model can more accurately differentiate between back-to-back utterances (e.g., with minimal intervening silence), which commonly occurs in noisy ATC radio channels.

However, an SBD model can be otherwise trained.

Training a language model S140 functions to train a language model to distinguish ATC linguistic patterns. In variants, the language model can determine whether a transcript is contextually correct/logical (e.g., syntactically correct, based on ATC grammar, etc.), determine a language/syntax score for a transcript, and/or otherwise determine whether a transcript makes sense. Preferably, S140 tunes a pre-existing language model (e.g., convolutional neural network, FairSeq ConvLM, etc.), but can alternately train an untrained language model. An existing language model can be tuned based on ATC transcripts, which can be single utterance ATC transcripts, multi-utterance ATC transcripts, and/or boundary annotated ATC transcripts (e.g., such as those used to train the SBD model in S120), however the language model can be trained using any suitable ATC transcripts. S140 preferably does not train on the ATC audio, but can alternatively train on the ATC audio. In variants, the language model can be trained using entity-tagged ATC transcripts, which identify ATC specific entities within the transcript. Tagged entities can include: carriers, aircraft, waypoints, airports, numbers, directions, and/or any other suitable entities. Entity tags can be assigned manually, automatically (e.g., unsupervised), with a semi-supervised HMM tagger (e.g., using a domain expert evaluation tool, etc.), and/or in any other suitable manner. A single word or phrase appearing in a transcript can be assigned to multiple entities depending on the context in which it appears (i.e., the entity tag lexicon can include multiple phonetically and/or lexicographically conflicting entities which are pronounced and/or spelled substantially identically). In an example, "Southwest" can be tagged as (and/or communicate) a direction or a carrier depending on the context in which it appears. Likewise, in a second example, "delta" can be tagged as part of an aircraft name (e.g., DAL456="delta alpha lima four five six"), a carrier, and/or untagged (e.g., referring to a change in value or parameter) depending on the context in which it appears. In a third example, "Lima" can be an airport, a waypoint, part of an aircraft name, and/or otherwise tagged. In a fourth example, waypoints can be pronounced substantially identically (e.g., "ocean") while corresponding to different waypoint entities depending on the context in which they appear (further details on waypoint disambiguation and/or clarification below). However, the language model can be trained with any other suitable transcripts and/or information.

In variants, a portion of the training text provided to train the language model is the same as that used to originally train the pre-existing language model (e.g., FairSeq ConvLM). Accordingly, the language model can be 'tuned' by providing the neural network a mix (e.g., 50/50, 60/40, 70/30, pre-determined mix, etc.) of ATC training transcripts and the original training data (e.g., from the pre-existing model). However, a language model can be otherwise trained for ATC linguistic patterns.

Figure 5:
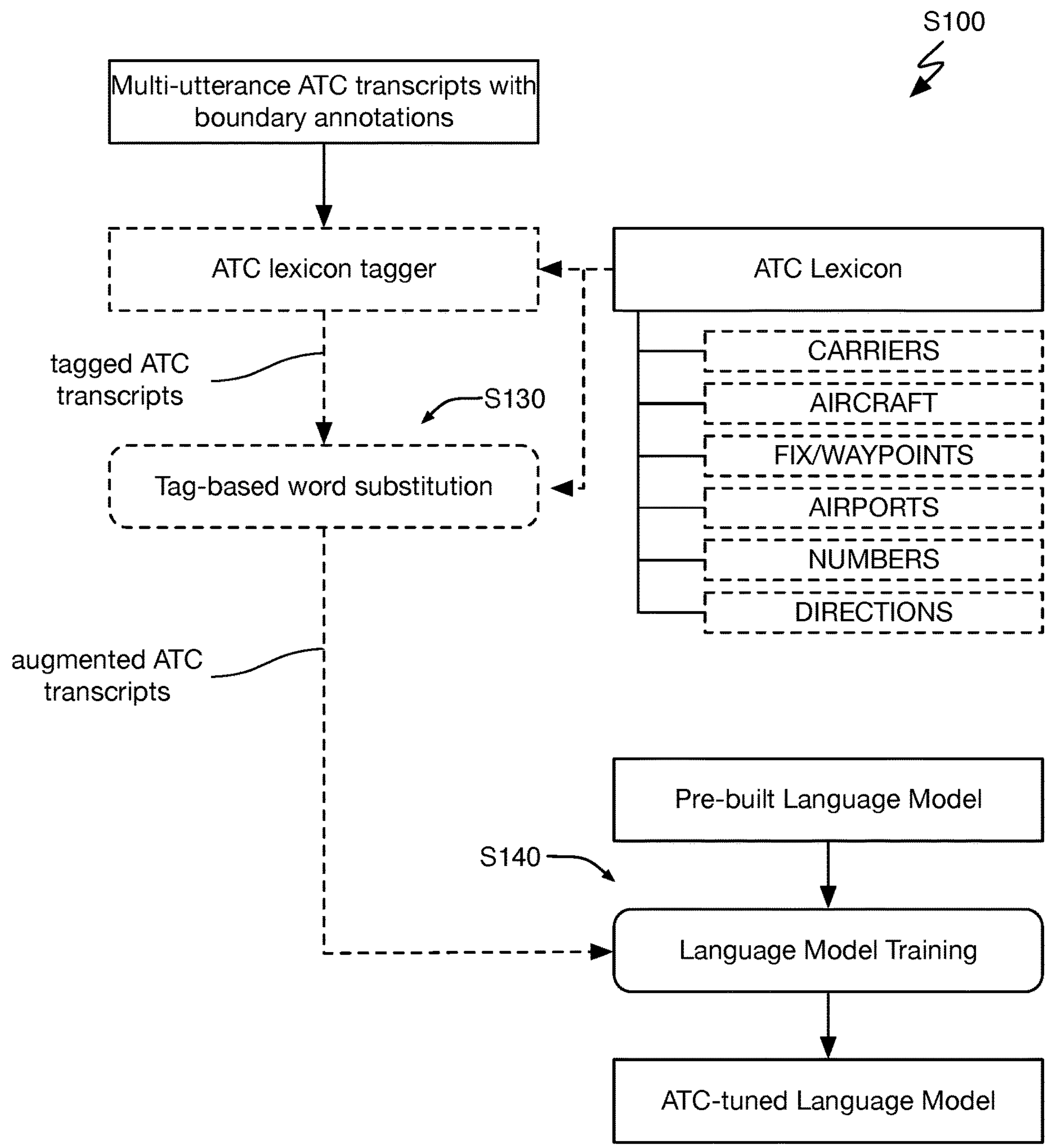
FIG. 5 is a diagrammatic representation of an example of training a language model in a variant of the method.

S100 can optionally include generating augmented ATC transcripts S130 (e.g., synthetic transcripts), which functions to expand the number/quantity of ATC training transcripts available to train the language model in S140, an example of which is shown in FIG. 5. In variants, this can be beneficial in order to provide training transcripts specific to areas/regions where entities are known (e.g., airport names, waypoints, carriers, etc.), but from which ATC transcripts are unavailable. Additionally or alternately, S130 can improve the accuracy of the language model by increasing a size of the training dataset (e.g., number of available utterance transcripts). S130 preferably substitutes the values of tagged entities (e.g., within the entity-tagged ATC transcripts) with different entity values from an ATC entity lexicon. The ATC entity lexicon can be manually generated, generated by a domain expert (e.g., pilot), randomly generated (e.g., number substitution), generated using: historical flight logs, aircraft databases, airport databases, randomly generated, and/or otherwise generated. In variants, the augmented ATC transcripts can preferentially (e.g., at a higher rate; with greater frequency; occurring with greater than a threshold number of instances—such as 3 or more within the training set) substitute phonetically and/or lexicographically conflicting entity names (e.g., which are identified by multiple tags in different contexts), such as "southwest" and "delta." The augmented ATC transcripts can then be used to train the language model in S140 and/or question-and-answer model in S150 (e.g., an example of training an ATC-tuned language model is shown in FIG. 5).

However, ATC transcripts can be otherwise generated. Alternatively, the system (and/or neural network models therein) can be trained entirely with real ATC communication transcripts.

S100 can include training a question-and-answer (Q/A) module S150, which functions to train a model to answer ATC-specific queries. S150 preferably includes tuning a pre-trained language model, but can include training an untrained model. The language model can be trained using: an ATC transcript, the associated parsed meaning (e.g., reference outputs; answers to the queries; values for command parameters determined from the ATC transcript, etc.), the set of command queries, and/or other data. In variants, S150 can also provide the language model contextual information pertaining to a particular utterance-such as a tail number or carrier for a particular aircraft, a flight plan for the aircraft, a set of utterance transcripts preceding the particular utterance, and/or any other suitable contextual information.

The text transcripts used to train the Q/A model can be the same ATC transcripts used to train the ASR and/or SBD model, the same ATC transcripts (and/or augmented ATC transcripts) used to train the language model, the utterance hypotheses output by the Speech-to-Text module, and/or other transcripts. However, the Q/A model can be trained using any suitable ATC transcripts.

Figure 6:
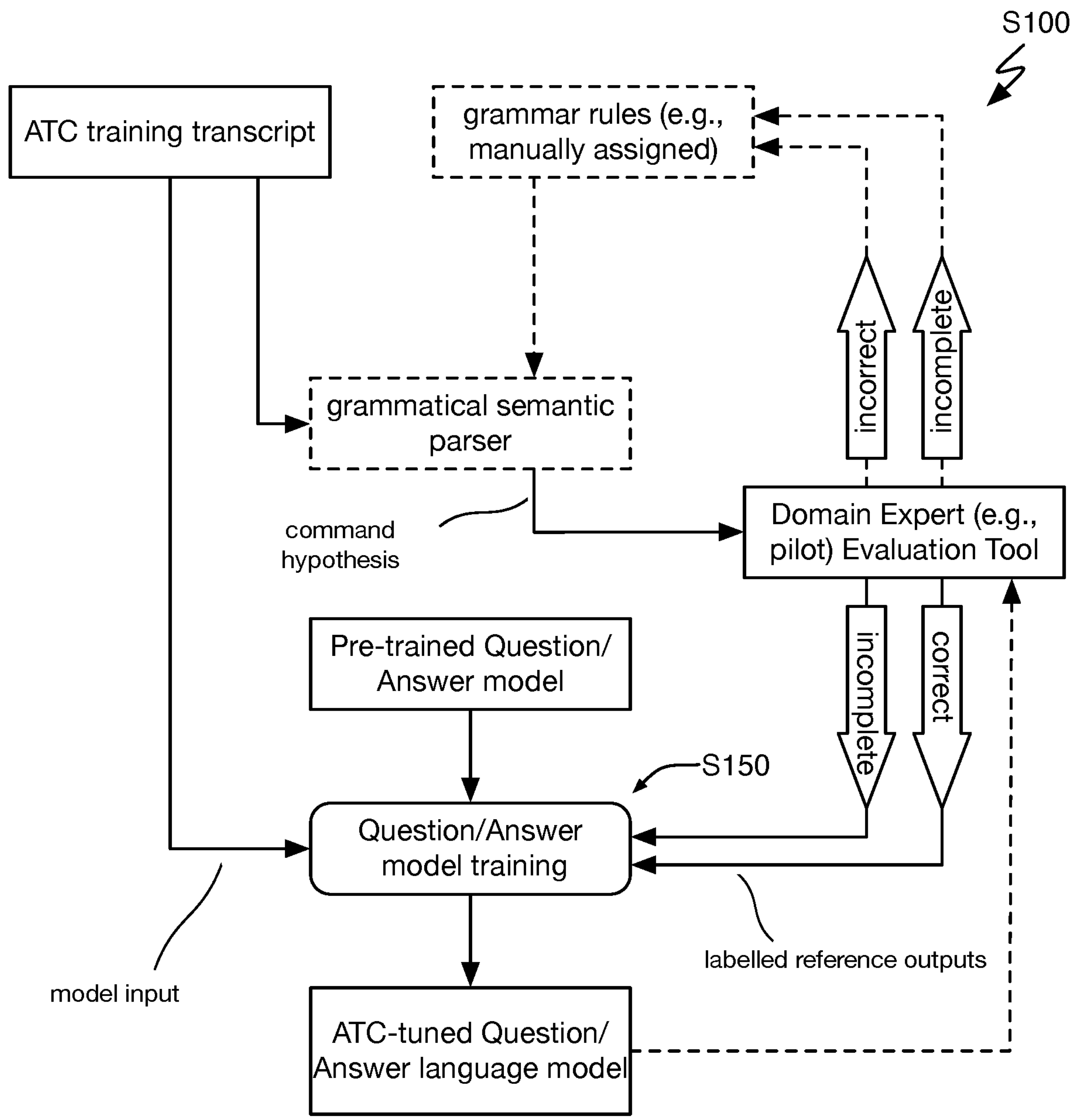
FIG. 6 is a diagrammatic representation of an example of training a Question/Answer model in a variant of the method.

The parsed meaning used to train the Q/A model can be: manually determined, manually audited by a domain expert, provided by a grammatical semantic parser (e.g., SEMPRE, a lower-accuracy parser than the system, a previous iteration of the system, etc.; an example is shown in FIG. 6) referencing ATC grammar (e.g., manually determined, iteratively determined, learned, etc.), and/or otherwise suitably determined.

In a specific example, a grammatical semantic parser parses the command parameter values from the ATC transcripts, wherein the parsed values (e.g., command hypotheses), source transcript, optionally ATC audio, and/or other data are presented on a domain evaluation tool (an example is shown in FIG. 8) to domain experts. The domain expert can: label to the model output (e.g., as "correct," "incomplete," "incorrect," etc.), correct the parsed values, and/or otherwise interact with the parser output. In variants, reference outputs labelled as "incorrect" and/or "incomplete" can be reviewed and used to update or improve grammar rules of a grammatical semantic parser. In variants, reference outputs labelled "incorrect" are not used to train the Q/A model, but can alternately be used to train the Q/A model (e.g., the "incorrect" label serving to train by counterexample). In variants, reference outputs which are labelled as "correct" and/or "incomplete" can be passed into the Q/A model during S150. In variants, incomplete label data can be used to train a subset of queries associated with a particular utterance (e.g., based on the correctly labelled portions of the transcript). As an example, where the parameter values may be unlabelled and the topics are identified, the topics may be used to train a command identification (e.g., "topics?") query. Likewise, where the aircraft tail number is tagged/identified, incomplete label data can be used to train the plane-specific speaker identification query(ies). However, the labels can be otherwise used, and model outputs can be otherwise suitably determined.

However, a question-and-answer model can be otherwise suitably trained.

In variants, the ASR model, SBD model, language model, and/or Q/A model can be optionally retrained and/or updated based on pilot/PIC validation with any suitable update frequency. The models can be updated/retrained independently, synchronously, asynchronously, periodically (e.g., with a common update frequency, with different frequencies), never (e.g., which may be desirable in instances where the deterministic model(s) are certified), based on auditing of the intermediate outputs, and/or can be otherwise suitably updated or trained. The models can be updated locally, onboard the aircraft, periodically via remote/cloud (push) updates, and/or can be otherwise suitably updated/retrained.

In variants, the model(s) can be audited based on a pilot rejection of the final output parameters in order to locate error origin(s) within the data pipeline (e.g., as part of a root cause analysis), which can be used as a training input to improve the network. As an example: an erroneous intermediate parameter (such as in the utterance hypothesis or linguistic hypothesis) can result in an incorrect output of the Q/A module even in cases where the Q/A module performs correctly. In variants, the outputs of each model/module can additionally be audited against a formatting template prescribed to each step (e.g., to enable certification compliance of the system). However, the system and/or various subcomponents can be otherwise suitably audited.

However, the system components can be otherwise suitable trained.

4.2 Runtime/Inference

S200 can include: at an aircraft, receiving an audio utterance from air traffic control S210, converting the audio utterance into a predetermined format S215, determining commands using a question-and-answer model S240, and controlling the aircraft based on the commands S250. However, the method S200 can additionally or alternatively include any other suitable elements. S200 functions to automatically interpret flight commands from the air traffic control (ATC) stream. The flight commands can be automatically used to control aircraft flight; presented to a user (e.g., pilot, a remote teleoperator); relayed to an auto-pilot system in response to a user (e.g., pilot) confirmation; and/or otherwise used.

All or portions of S200 can be performed continuously, periodically, sporadically, in response to transmission of a radio receipt, during aircraft flight, in preparation for and/or following flight, at all times, and/or with any other timing. S200 can be performed in real- or near-real time, or asynchronously with aircraft flight or audio utterance receipt.

S200 is preferably performed onboard the aircraft, but can alternatively be partially or entirely performed remotely.

Receiving an audio utterance from air traffic control S210 functions to receive a communication signal at the aircraft and/or convert the communication signal into an audio input, which can be processed by the ASR module. In a specific example, S210 transforms an analog radio signal into a digital signal using an A/D converter (and/or other suitable wireless communication chipset), and sends the digital signal to the ASR module (e.g., via a wired connection) as the audio input. S210 preferably monitors a single radio channel (e.g., associated with the particular aircraft), but can alternately sweep multiple channels (e.g., to gather larger amounts of ATC audio data). However, S210 can otherwise suitably receive an utterance.

Converting the audio utterance into a predetermined format S215 functions to generate a transcript from the ATC audio. This can be performed by the Speech-to-Text module or other system component. Converting the audio utterance to into a predetermined (e.g., text) format can include: determining a set of utterance hypotheses for an utterance S220 and selecting an utterance hypothesis from the set of utterance hypotheses S230; however, the ATC audio can be otherwise converted.

Determining a set of utterance hypotheses for an utterance S220 functions to identify audio patterns (e.g., such as letters, phonemes, words, short phrases, etc.) within the utterance. In a specific example, S220 can be performed by the Speech-to-Text module, an ASR module (and/or ASR model therein), an integrated ASR/SBD module (e.g., with an integrated ASR/SBD model therein), a language module, and/or combinations thereof. S220 can optionally include assigning a weight or score to each audio pattern (a.k.a. linguistic hypothesis) using the ASR module and/or other modules. An utterance hypothesis can be: a linguistic hypothesis, a series of linguistic hypotheses, and/or any other suitable hypothesis.

In a first variation, an ASR and/or integrated SBD/ASR module generates a set of linguistic hypotheses, wherein a language module receives the linguistic hypotheses and generates a score (e.g., ASR score; same or different from language weight/score) for each string or sequence of linguistic hypotheses. One or more linguistic hypothesis sets can be generated from the same audio clip. The SBD/ASR module can also output a score (ASR score or ASR weight) for each linguistic hypothesis, sequence of hypotheses, and/or set of linguistic hypotheses. However, the set of utterance hypotheses can be otherwise determined.

Selecting an utterance hypothesis from the set of utterance hypotheses S230 functions to detect language patterns from the set of linguistic hypotheses in the context of the entire utterance. Additionally or alternately, S230 can function to select the highest probability string/sequence of linguistic hypotheses as the utterance hypothesis. S230 can be performed by the language module, the Q/A module, and/or another module.

In a first variation, the language module can select the string or sequence of linguistic hypotheses which has the highest combined language weight (or score) and ASR weight (or score) as the utterance hypothesis.

In a second variation, multiple modules' outputs are cooperatively used to select the utterance hypothesis. For example, the utterance hypothesis with the highest combined hypothesis score and/or maximum hypothesis weight cooperatively determined by the language model and the integrated ASR/SBD model is selected. In a first example, the utterance hypothesis which maximizes the language weight multiplied by the ASR weight for an utterance is selected. In a second example, the hypothesis which maximizes the sum of the language score and the ASR score for an utterance.

However, the utterance hypothesis can be otherwise selected.

Determining commands from the utterance hypothesis using a question-and-answer model S240 functions to extract flight commands from the utterance hypothesis, which can be interpreted and/or implemented by a flight processing system. S240 is preferably performed by one or more instances of the Q/A module, but can be performed by another component. S240 is preferably performed using the set of flight command queries and the utterance hypothesis, but can be otherwise performed.

S240 can include providing the Q/A module with a set of command queries in addition to the utterance hypothesis as an input, wherein the Q/A module answers the command queries using the utterance hypothesis as a reference text. In a first embodiment, the queries are provided serially, wherein the successive query is determined based on the prior answer. The query series can be determined from the command query set structure (e.g., list, tree, etc.), randomly determined, or otherwise determined. In a specific example, S240 includes querying for topic presence within the utterance hypothesis, then only querying for values for the topics confirmed to be within the utterance. In a second specific example, S240 includes initially determines if the aircraft (and/or pilot) is the intended recipient of the utterance (associated with the utterance hypothesis), and only querying further if the utterances are intended for the aircraft/pilot (e.g., utterances not intended for the aircraft/pilot are ignored and/or any commands therein are not passed to the flight processing system; utterances corresponding to a transition speaker detections can be neglected; etc.). Alternatively, the Q/A model (or different versions or instances thereof) can be queried with multiple queries in parallel or can be otherwise queried.

In a second variant, the Q/A module includes pre-embedded queries, wherein the Q/A module answers a predetermined set of questions based on the utterance hypothesis. For example, the Q/A module can be a multi-class classifier that outputs values, determined from the utterance hypothesis, for each of a set of "classes," wherein each class represents a command parameter. However, S240 can otherwise suitably determine command parameter values.

S200 can optionally include controlling the aircraft based on the commands S250, which functions to modify the aircraft state according to the utterance (e.g., ATC directives). In a specific example, S250 autonomously controls the effectors and/or propulsion systems of the aircraft according to the commands (e.g., to achieve the commanded values). In a second example, the flight processing system can change waypoints and/or autopilot inputs based on the commands. In variants, S200 can include providing the commands to a flight processing system (e.g., FCS) in a standardized format (e.g., a standardized machine-readable format).

However, S250 can otherwise suitably control the aircraft based on the commands. Alternatively, the system can be used entirely in an assistive capacity (e.g., without passing commands to an aircraft processor or controlling the aircraft, such as to enable control of an aircraft by a hearing-impaired pilot), and/or can be otherwise used.

However, S200 can include any other suitable elements.

5. Waypoints.

Aviation waypoints have unique spellings per regulatory guidelines to avoid a single reference from being confused with multiple locations. These waypoints are intended to be pronounced or sounded-out using standardized speech phonetics (e.g., English vocal sounds and phrases). For example, 'ocean' is a common reference phrase which may be useful for navigation (e.g., around coastlines), but only a single waypoint entity can be associated with the spelling O-C-E-A-N. As a result, it is common for multiple waypoint spelling to be associated with the same intended pronunciation, which are frequently not known English spellings. For instance, A-A-A-X-X (a waypoint in Texas), A-X-X-E-E (a waypoint in Oklahoma), and A-X-X-X-X (a waypoint in California) could each be viable spellings for an utterance of "axe" depending on the context. Additionally, some waypoint pronunciations may be based on colloquial phrases or jargon rather than individual words or common word phrases. In variants, the system can be trained to determine waypoint spellings based on the pronunciation of waypoint entities within an utterance.

In variants, the waypoints spellings can be determined and/or deconflicted based on contextual information associated with the utterance, such as the location of the aircraft, a local/current geographic region, an ATC tower associated with the utterance, flight plan (e.g., and/or waypoints associated therewith), aircraft information (e.g., tail number, class of aircraft, etc.), and/or any other suitable contextual information, wherein different contexts can be associated with different sets of waypoint entities. In one set of variants, known waypoint spellings can be associated with a waypoint entity lexicon (e.g., FAA database, etc.). In some variants, contextual information can be received at the aircraft (e.g., wirelessly, by a manual input, etc.) as a part of a flight plan and/or prior to departure. For instance, a subset of waypoint entity spellings of the lexicon (i.e., those within a threshold distance of a flightpath, etc.) can be received as inputs prior to runtime and/or prior to departure. Additionally or alternatively, the contextual information can be determined by the aircraft during operation (e.g., based on onboard sensors, such as the aircraft GPS).

Waypoint spellings are preferably determined using the speech-to-text module as a part of the utterance hypothesis (e.g., generated using an ASR model and/or an integrated SBD/ASR model), but can be otherwise determined. For example, the speech-to-text module can predict a waypoint spelling given an audio signal. The speech-to-text module can optionally predict the waypoint spelling given a waypoint entity lexicon and/or a geographic identifier (e.g., geocoordinates for the aircraft's currently location, city identifier, region identifier, etc.), wherein the speech-to-text module deconflicts waypoint spellings based on the geographic identifier and/or lexicon. For instance, a set of waypoint spellings can be determined using the ASR model, from which an ATC-tuned language model can select a waypoint spelling (e.g., as a part of the selected utterance) based on the contextual information (e.g., language score maximizing waypoint spelling based on the contextual information). Additionally or alternatively, the language model selects or highly-scores the waypoint entity hypotheticals that substantially match waypoint entities in the waypoint entity lexicon (e.g., associated with the aircraft's contextual information). Additionally or alternatively, the Q&A model queries the transcript for waypoint entities from the waypoint entity lexicon associated with the aircraft's contextual information (e.g., only identifies waypoint entities from the waypoint entity lexicon). However, the waypoint spellings can be otherwise determined and/or the waypoint entities can be otherwise deconflicted.

The system can optionally identify when waypoint clarification is needed. In variants, the system can determine a satisfaction of a waypoint clarification condition when: a language score is below a predetermined confidence threshold (e.g., when a selected spelling is not within the subset received prior to runtime, when the selected waypoint spelling is associated with a location outside of a flight range of the aircraft, when the confidence score for each waypoint entity hypothetical falls below a predetermined value, etc.); when the Q&A model fails to find a waypoint entity within the transcript; and/or upon satisfaction of any other suitable waypoint clarification condition.

In response to satisfaction of a waypoint clarification condition, the system can facilitate spelling clarification. In a first variant, spelling clarification includes querying ATC via the communication system. For example, the system can automatically generate response audio including a per-letter pronunciation for each letter in a candidate waypoint entity hypothesis (e.g., the highest-confidence entity hypothesis; using the English alphabet, the NATO-phonetic alphabet; etc.), and transmit the response audio to ATC for clarification (e.g., "proceed direct VPMID call sign," where VPMID is the waypoint entity hypothesis). In another example, the system can automatically request that ATC repeat the waypoint pronunciation (e.g., "can you repeat the waypoint," "can you repeat that or say again, broken transmission," etc.), optionally with instructions (e.g., "can you slow down"). In this example, the system can also identify the audio clip and/or associated entity preceding the potential waypoint audio clip, and provide the audio clip or associated entity pronunciation in the request (e.g., "spell waypoint after [entity value]"). The method can be executed for the subsequent ATC response to determine a clarified waypoint entity value. For example, the waypoint spelling hypothesis can be updated based on an automatic speech recognition (ASR) analysis (e.g., using the ASR module of the speech-to-text module) of an ATC response to the NATO-phonetic spelling clarification. The clarified waypoint entity value can be inserted into the transcript, used by the Q&A model to fill out the pre-clarification instructions, and/or be otherwise used.

In a second variant, spelling clarification includes re-analyzing the ATC audio (e.g., with the same clips or differently-processed audio clips).

In a third variant, spelling clarification includes providing the audio clip or waypoint entity hypotheticals to a user (e.g., pilot), wherein the pilot enters or selects the correct waypoint entity. However, the waypoint entity value can be otherwise clarified. The clarification methods described above can also be applied to clarify the value for any other suitable entity (e.g., guidance commands, approach landing site, vehicle state parameters, etc.).

In one set of variants, a system for an aircraft for semantic parsing of air traffic control (ATC) utterances can include: a communication system onboard the aircraft, the communication subsystem configured to receive an ATC audio signal; and a first computing system connected to the communication system, comprising: a speech-to-text module configured to determine an utterance hypothesis from the audio signal, wherein the utterance hypothesis comprises a spelling hypothesis associated with a waypoint entity; and a second computing system connected to the first computing system and configured to control the aircraft based on the aircraft commands, wherein the aircraft commands are determined based on the utterance hypothesis.

5.1 Waypoint Variants.

In variants, the speech-to-text module can include a language model which is pre-trained to determine utterance hypotheses for ATC audio.

In variants, the language model is trained with audio signals having standardized language phonetics without prescriptive spellings.

In variants, the spelling hypothesis is based on a waypoint entity lexicon.

In variants, the waypoint entity lexicon comprises phonetically-conflicting waypoints.

In variants, the spelling hypothesis is based on a subset of the waypoint entity lexicon which is associated with at least one of: the aircraft, a flight plan, or a local geographic region.

In variants, the speech-to-text module includes an automatic speech recognition (ASR) module and a language model, wherein the speech-to-text module is configured to determine the utterance hypothesis by: with the ASR module, generating a plurality of linguistic hypotheses for an utterance comprising a plurality of waypoint spelling hypotheses; using the language model, determining a language score for each the plurality of linguistic hypotheses; and selecting an utterance hypothesis from the plurality of the linguistic hypotheses based on the corresponding language score.

In variants, the first computing system further comprises: a question-and-answer (Q/A) module configured to determine aircraft commands based on the utterance hypothesis using a plurality of natural language queries.

In variants, the aircraft commands are determined by querying a pre-trained neural network model according to a structured sequence of the natural language queries, the parameters of the pre-trained neural network model tuned with ATC audio.

In variants, the first computing system is configured to: in response to satisfaction of a waypoint clarification condition, facilitate spelling clarification via the communication system; and update the spelling hypothesis based on an automatic speech recognition (ASR) analysis of a radio response to the spelling clarification.

In variants, the waypoint clarification is based on at least one of: a language score falling below threshold value, the language score determined using a language model which is pretrained using waypoint pronunciations; and a waypoint proximity relative to the aircraft which is determined using a prior map of waypoint entities.

In variants, the spelling hypothesis is determined at least partially with a language model, wherein the language model is updated based on the audio signal and the ASR analysis.

In variants, the utterance hypothesis comprises a language score at least partially associated with the waypoint entity, wherein the waypoint clarification condition comprises the language score satisfying a confidence threshold.

In a second set of variants, a method for semantic parsing of an air traffic control (ATC) utterance can include: at a computing system onboard an aircraft, determining a set of waypoint entity spellings; receiving an audio signal associated with an ATC radio utterance; at the computing system, automatically determining an utterance hypothesis based on the audio signal, comprising: based on the set of waypoint entity spellings, determining a waypoint spelling hypothesis and an associated language score; and based on the language score satisfying confidence threshold, automatically determining an aircraft command based on the waypoint spelling hypothesis; and facilitating aircraft control based on the aircraft command.

In variants, the waypoint spelling hypothesis and an associated language score are determined using a language model, wherein the language model is a neural network pre-trained using ATC audio with waypoint pronunciations tagged with a corresponding waypoint entity.

In variants, determining a waypoint spelling hypothesis and an associated language score can include: with an automatic speech recognition (ASR) module, generating a plurality of linguistic hypotheses for the audio signal comprising a plurality of waypoint spelling hypotheses; using the language model, determining a language score for each the plurality of linguistic hypotheses; and selecting the utterance hypothesis from the plurality of the linguistic hypotheses based on the associated language score according to a set of rules.

In variants, determining the set of waypoint entity spellings comprises receiving the waypoint entity spellings at the computing system based on a flight plan or a local geographic region.

In variants, the method can further include: in response to satisfaction of a waypoint clarification condition, facilitating a NATO-phonetic spelling clarification via a communication system onboard the aircraft; and updating the spelling hypothesis based on an automatic speech recognition (ASR) analysis of an ATC response to the NATO-phonetic spelling clarification.

In variants, at least one of the language score and the waypoint spelling hypothesis is determined using a neural network pre-trained using ATC audio, wherein the method further comprises: updating the pre-trained neural network based on the audio signal and updated spelling hypothesis.

In variants, the aircraft commands are automatically determined by querying a pre-trained neural network model according to a structured sequence of the natural language queries, the parameters of the pre-trained neural network model tuned with ATC audio.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system for an aircraft for semantic parsing of air traffic control (ATC) utterances, the system comprising:
a communication system onboard the aircraft, the communication subsystem configured to receive an ATC audio signal; and
a first computing system connected to the communication system, comprising:
a speech-to-text module configured to determine an utterance hypothesis from the audio signal, wherein the utterance hypothesis comprises a spelling hypothesis associated with a waypoint entity,
wherein the first computing system is configured to:
in response to satisfaction of a waypoint clarification condition, facilitate spelling clarification via the communication system; and
update the spelling hypothesis based on an automatic speech recognition (ASR) analysis of a radio response to the spelling clarification; and
a second computing system connected to the first computing system and configured to control the aircraft based on the aircraft commands, wherein the aircraft commands are determined based on the utterance hypothesis.

2. The system of claim 1, wherein the speech-to-text module comprises a language model which is pre-trained to determine utterance hypotheses for ATC audio.

3. The system of claim 2, wherein the language model is trained with audio signals having standardized language phonetics without prescriptive spellings.

4. The system of claim 1, wherein the spelling hypothesis is based on a waypoint entity lexicon.

5. The system of claim 4, wherein the waypoint entity lexicon comprises phonetically-conflicting waypoints.

6. The system of claim 4, wherein the spelling hypothesis is based on a subset of the waypoint entity lexicon which is associated with at least one of: the aircraft, a flight plan, or a local geographic region.

7. The system of claim 1, wherein the speech-to-text module comprises an automatic speech recognition (ASR) module and a language model, wherein the speech-to-text module is configured to determine the utterance hypothesis by:
with the ASR module, generating a plurality of linguistic hypotheses for an utterance comprising a plurality of waypoint spelling hypotheses;
using the language model, determining a language score for each the plurality of linguistic hypotheses; and
selecting an utterance hypothesis from the plurality of the linguistic hypotheses based on the corresponding language score.

8. The system of claim 1, wherein the first computing system further comprises: a question-and-answer (Q/A) module configured to determine aircraft commands based on the utterance hypothesis using a plurality of natural language queries.

9. The system of claim 8, wherein the aircraft commands are determined by querying a pre-trained neural network model according to a structured sequence of the natural language queries, the parameters of the pre-trained neural network model tuned with ATC audio.

10. The system of claim 1, wherein the waypoint clarification is based on at least one of:
a language score falling below threshold value, the language score determined using a language model which is pretrained using waypoint pronunciations; and
a waypoint proximity relative to the aircraft which is determined using a prior map of waypoint entities.

11. The system of claim 1, wherein the spelling hypothesis is determined at least partially with a language model, wherein the language model is updated based on the audio signal and the ASR analysis.

12. The system of claim 1, wherein the utterance hypothesis comprises a language score at least partially associated with the waypoint entity, wherein the waypoint clarification condition comprises the language score satisfying a confidence threshold.

13. A method for semantic parsing of an air traffic control (ATC) utterance, the method comprising:
at a computing system onboard an aircraft, determining a set of waypoint entity spellings;
receiving an audio signal associated with an ATC radio utterance;
at the computing system, automatically determining an utterance hypothesis based on the audio signal, comprising:
based on the set of waypoint entity spellings, determining a waypoint spelling hypothesis and an associated language score, wherein the waypoint spelling hypothesis and the associated language score are determined using a language model, wherein the language model is a neural network pre-trained using ATC audio with waypoint pronunciations tagged with a corresponding waypoint entity; and
based on the language score satisfying confidence threshold, automatically determining an aircraft command based on the waypoint spelling hypothesis; and
facilitating aircraft control based on the aircraft command.

14. The method of claim 13, wherein determining a waypoint spelling hypothesis and an associated language score comprises:
with an automatic speech recognition (ASR) module, generating a plurality of linguistic hypotheses for the audio signal comprising a plurality of waypoint spelling hypotheses;
using the language model, determining a language score for each the plurality of linguistic hypotheses; and
selecting the utterance hypothesis from the plurality of the linguistic hypotheses based on the associated language score according to a set of rules.

15. The method of claim 13, wherein determining the set of waypoint entity spellings comprises receiving the waypoint entity spellings at the computing system based on a flight plan or a local geographic region.

16. The method of claim 13, further comprising:
in response to satisfaction of a waypoint clarification condition, facilitating a NATO-phonetic spelling clarification via a communication system onboard the aircraft; and
updating the spelling hypothesis based on an automatic speech recognition (ASR) analysis of an ATC response to the NATO-phonetic spelling clarification.

17. The method of claim 16, wherein the at least one of the language score and the waypoint spelling hypothesis is determined using a neural network pre-trained using ATC audio, wherein the method further comprises: updating the pre-trained neural network based on the audio signal and updated spelling hypothesis.

18. The method of claim 13, wherein the aircraft commands are automatically determined by querying a pre-trained neural network model according to a structured sequence of the natural language queries, the parameters of the pre-trained neural network model tuned with ATC audio.

19. A system for an aircraft for semantic parsing of air traffic control (ATC) utterances, the system comprising:

a communication system onboard the aircraft, the communication subsystem configured to receive an ATC audio signal; and a first computing system connected to the communication system, comprising:

a speech-to-text module configured to determine an utterance hypothesis from the audio signal, wherein the utterance hypothesis comprises a spelling hypothesis associated with a waypoint entity, the speech-to-text module comprising: an automatic speech recognition (ASR) module and a language model, wherein the speech-to-text module is configured to determine the utterance hypothesis by:

with the ASR module, generating a plurality of linguistic hypotheses for an utterance comprising a plurality of waypoint spelling hypotheses;

using the language model, determining a language score for each the plurality of linguistic hypotheses; and selecting an utterance hypothesis from the plurality of the linguistic hypotheses based on the corresponding language score; and a second computing system connected to the first computing system and configured to control the aircraft based on the aircraft commands, wherein the aircraft commands are determined based on the utterance hypothesis.

* * * * *